(12) United States Patent
Iwamatsu et al.

(10) Patent No.: US 8,299,700 B2
(45) Date of Patent: Oct. 30, 2012

(54) ELECTRON EMITTING ELEMENT HAVING AN ELECTRON ACCELERATION LAYER, ELECTRON EMITTING DEVICE, LIGHT EMITTING DEVICE, IMAGE DISPLAY DEVICE, COOLING DEVICE, AND CHARGING DEVICE

(75) Inventors: Tadashi Iwamatsu, Osaka (JP); Ayae Nagaoka, Osaka (JP); Hiroyuki Hirakawa, Osaka (JP); Yasuo Imura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 293 days.

(21) Appl. No.: 12/699,349

(22) Filed: Feb. 3, 2010

(65) Prior Publication Data

US 2010/0196050 A1    Aug. 5, 2010

(30) Foreign Application Priority Data

Feb. 5, 2009    (JP) .................................. 2009-024596
Mar. 6, 2009   (JP) .................................. 2009-054231

(51) Int. Cl.
*G05G 15/02*   (2006.01)
*H01J 1/02*    (2006.01)
*H01J 9/02*    (2006.01)
*H05B 41/00*   (2006.01)

(52) U.S. Cl. ............ 313/497; 313/309; 313/310; 445/23

(58) Field of Classification Search .......... 313/495–497, 313/306, 310–311
See application file for complete search history.

(56) References Cited

U.S. PATENT DOCUMENTS 4,857,161 A    8/1989   Borel
5,891,548 A    4/1999   Graiver
5,962,959 A    10/1999  Iwasaki et al.
6,023,124 A    2/2000   Chuman et al.
6,130,503 A    10/2000  Negishi et al.
6,166,487 A    12/2000  Negishi et al.
6,462,467 B1   10/2002  Russ
6,626,724 B2   9/2003   Yamamoto et al.
6,628,053 B1   9/2003   Den et al.

(Continued)

FOREIGN PATENT DOCUMENTS

CN    1755889 A    4/2006

(Continued)

OTHER PUBLICATIONS

Notice of Allowance mailed Nov. 29, 2011 in U.S. Appl. No. 12/782,102.

(Continued)

*Primary Examiner* — Tracie Y Green
(74) *Attorney, Agent, or Firm* — Nixon & Vanderhye, P.C.

(57) ABSTRACT

An electron emitting element of the present invention includes an electron acceleration layer provided between an electrode substrate and a thin-film electrode, which electron acceleration layer includes (a) conductive fine particles and (b) insulating fine particles having an average particle diameter greater than that of the conductive fine particles. The electron emitting element satisfies the following relational expression: $0.3x+3.9 \leq y \leq 75$, where x (nm) is an average particle diameter of the insulating fine particles, and y (nm) is a thickness of the thin-film electrode 3.

Such a configuration allows modification of the thickness of the thin-film electrode with respect to the size of the insulating particles, thereby ensuring electrical conduction and allowing sufficient current to flow inside the element. As a result, stable emission of ballistic electrons from the thin-film electrode is possible.

23 Claims, 14 Drawing Sheets

U.S. PATENT DOCUMENTS

| | | | |
|---|---|---|---|
| 6,844,664 B2 | 1/2005 | Takegawa et al. | |
| 7,723,909 B2 | 5/2010 | Yamaguchi et al. | |
| 8,110,971 B2 * | 2/2012 | Hirakawa et al. | 313/311 |
| 8,164,247 B2 * | 4/2012 | Hirakawa et al. | 313/495 |
| 2001/0017369 A1 | 8/2001 | Iwasaki et al. | |
| 2001/0026123 A1 | 10/2001 | Yoneda | |
| 2002/0136896 A1 | 9/2002 | Takikawa et al. | |
| 2003/0102793 A1 | 6/2003 | Komoda et al. | |
| 2004/0021434 A1 | 2/2004 | Yoneda | |
| 2004/0046914 A1 | 3/2004 | Hirota | |
| 2004/0150768 A1 | 8/2004 | Shimizu et al. | |
| 2004/0197943 A1 | 10/2004 | Izumi | |
| 2004/0201345 A1 | 10/2004 | Hirokado | |
| 2004/0246408 A1 | 12/2004 | Ando | |
| 2005/0181566 A1 | 8/2005 | Machida et al. | |
| 2005/0212398 A1 | 9/2005 | Okano et al. | |
| 2006/0012278 A1 | 1/2006 | Nanataki et al. | |
| 2006/0061967 A1 | 3/2006 | Kim et al. | |
| 2006/0065895 A1 | 3/2006 | Kusunoki et al. | |
| 2006/0152138 A1 | 7/2006 | Hori et al. | |
| 2006/0186786 A1 | 8/2006 | Iwamatsu et al. | |
| 2006/0244357 A1 | 11/2006 | Lee | |
| 2006/0284543 A1 | 12/2006 | Chung et al. | |
| 2006/0290291 A1 | 12/2006 | Aizawa | |
| 2006/0291905 A1 | 12/2006 | Hirakawa et al. | |
| 2007/0210697 A1 | 9/2007 | Tamura et al. | |
| 2007/0222067 A1 | 9/2007 | Nanataki et al. | |
| 2009/0091526 A1 | 4/2009 | Hirota | |
| 2010/0215402 A1 | 8/2010 | Nagaoka | |
| 2010/0278561 A1 | 11/2010 | Kanda et al. | |
| 2010/0295465 A1 | 11/2010 | Hirakawa | |
| 2010/0296842 A1 | 11/2010 | Imura | |
| 2010/0296843 A1 | 11/2010 | Hirawaka | |
| 2010/0296844 A1 | 11/2010 | Imura | |
| 2010/0296845 A1 | 11/2010 | Hirakawa | |
| 2010/0307724 A1 | 12/2010 | Ichii et al. | |
| 2010/0327730 A1 | 12/2010 | Hirakawa | |
| 2011/0129256 A1 | 6/2011 | Hirakawa et al. | |

FOREIGN PATENT DOCUMENTS

| | | |
|---|---|---|
| CN | 1763885 A | 4/2006 |
| CN | 1849673 A | 10/2006 |
| EP | 1 617 449 | 1/2006 |
| EP | 1 617 450 A2 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 1-279557 | 11/1989 |
| JP | 01-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 10-308166 A | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-5205 A | 1/2005 |
| JP | 2005-190878 A | 7/2005 |
| JP | 2005-209396 A | 8/2005 |
| JP | 2005-268025 A | 9/2005 |
| JP | 2005-326080 A | 11/2005 |
| JP | 2005-328041 A | 11/2005 |
| JP | 2006-54162 | 2/2006 |
| JP | 2006-100758 A | 4/2006 |
| JP | 2006-190545 A | 7/2006 |
| JP | 2006-236964 | 9/2006 |
| JP | 2006-351524 A | 12/2006 |
| JP | 2007-290873 | 11/2007 |
| JP | 2009-019084 A | 1/2009 |
| JP | 2009-092902 A | 4/2009 |
| JP | 2009-146891 A | 7/2009 |
| JP | 4314307 B1 | 8/2009 |
| JP | 2010-267492 A | 11/2010 |
| TW | 1237722 | 8/2005 |
| TW | 1257117 | 6/2006 |
| TW | 200638455 A | 11/2006 |
| TW | 1278696 | 4/2007 |
| WO | 98/27568 A1 | 6/1998 |
| WO | 2005/004545 A1 | 1/2005 |
| WO | 2009/066723 | 5/2009 |

OTHER PUBLICATIONS

Notice of Allowance mailed Dec. 29, 2011 in U.S. Appl. No. 12/782,102.

Office Action mailed Nov. 29, 2011 in U.S. Appl. No. 12/698,435.

Office Action mailed Dec. 16, 2011 in U.S. Appl. No. 12/698,435.

Naoi et al., "TiO2 Films Loaded with Silver Nanoparticles: Control of Multicolor Photochromic Behavior", J. Am. Chem. Soc., vol. 126, No. 11, pp. 3664-3668, (2004).

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

U.S. Appl. No. 12/940,546, filed Nov. 5, 2010, entitled "Heat Exchanger".

English version of ISR for PCT/JP2009/052904 mailed Apr. 21, 2009.

ISR for PCT/JP2008/071102, mailed Feb. 24, 2009 (081423/PCT).

Electrophotography-Bases and Applications (1998; P. 213), The Society of Electrophotography of Japan, Corona Publishing Co., Ltd. (with partial English translation).

Ionic winds for locally enhanced cooling, David B. Go, Suresh V. Garimella, and Timothy S. Fisher, J. Appl. Phys., 102, 053302 (2007).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

Office Action mailed May 17, 2012 in U.S. Appl. No. 12/689,435.

Notice of Allowance mailed Apr. 17, 2012 in U.S. Appl. No. 12/781,997.

* cited by examiner

US 8,299,700 B2

ELECTRON EMITTING ELEMENT HAVING AN ELECTRON ACCELERATION LAYER, ELECTRON EMITTING DEVICE, LIGHT EMITTING DEVICE, IMAGE DISPLAY DEVICE, COOLING DEVICE, AND CHARGING DEVICE

This Nonprovisional application claims priority under 35 U.S.C. §119(a) on Patent Applications No. 2009-024596 filed in Japan on Feb. 5, 2009, and No. 2009-054231 filed in Japan on Mar. 6, 2009, the entire contents of which are hereby incorporated by reference.

TECHNICAL FIELD

The present invention relates to an electron emitting element and the like for emitting electrons by application of a voltage.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the element due to the intense electric field and collide with the surface. This causes a problem of breakdown of the element due to sputtering. Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the element are damaged. In order to prevent this problem, the members used around the electron emitting element are limited to members that have high resistance to ozone.

In order to solve this problem, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the element so that electrons are emitted from a flat surface of the element. These electron emitting elements do not require an intense electric field outside the elements, because the electrons which are accelerated in respective electron acceleration layers inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

For example, Patent Literature 1 discloses an MIM type electron emitting element that includes an insulating film in which fine particles such as metal are dispersed. The insulating film is provided between two electrodes as an electron acceleration layer, and electrons are injected into the electron acceleration layer from one of the electrodes (substrate electrode). The injected electrons are accelerated in the electron acceleration layer, and these electrons are emitted from the other one of the electrodes (electrode on an electron-emitting side). In Patent Literature 1, the electron acceleration layer is made to have a thickness of tens of Å to 1000 Å.

CITATION LIST

Patent Literature

Patent Literature 1
Japanese Patent Application Publication, Tokukaihei, No. 1-298623 A (Publication Date: Dec. 1, 1989)

SUMMARY OF INVENTION

Technical Problem

With the MIM type electron emitting element disclosed in Patent Literature 1, the electron acceleration layer that accelerates the electrons is an insulating film in which fine particles such as metal are dispersed. If the electron acceleration layer is made of particles and not the insulating film, the electron acceleration layer results to have an unleveled surface in accordance with particle size. Consequently, in a case where an electrode on the electron-emitting side is formed on the electron acceleration layer as a thin film, thickness of the electrode becomes uneven. Particularly, if the electrode on the electron-emitting side is formed by sputtering, the electrode becomes thin at a depressed part and the electrode becomes thick at a raised part. As a result, the unevenness of the electrode surface is emphasized.

If the electrode on the electron-emitting side is too thin, electrical conduction cannot be ensured, and not enough current can flow inside the element. Furthermore, such a thickness causes the element to drop in strength. In the opposite, if the electrode on the electron-emitting side is too thick, the electrons cannot be emitted. In this case, the electrons are absorbed by the electrode on the electron-emitting side, or alternatively, the electrons are reflected at the electrode on the electron-emitting side and are recaptured in the insulating film.

That is to say, with an electron emitting element that includes an electron acceleration layer using insulating particles, unless a thickness of the electrode on the electron-emitting side is modified with respect to the size of the insulating particles, it is not possible to stably emit ballistic electrons.

The present invention is accomplished in view of the above problem. An object of the present invention is to modify a thickness of a thin-film electrode with respect to a particle size of insulating particles, in an electrode emitting element including an electron acceleration layer made by using the insulating particles, which thin-film electrode is an electrode on an electron-emitting side of the electron emitting element. Further, another object of the present invention is to provide an electron emitting element that can stably emit ballistic electrons from the thin-film electrode, which emission is made possible by the modification of the thickness of the thin-film electrode, thereby ensuring electrical conduction and allowing a sufficient amount of current to flow inside the element.

Moreover, it is generally difficult to evenly disperse fine particles having a size of several nm to several hundred nm, inside a solvent or a solid. Hence, with the MIM type conventional electron emitting element that includes as an electron acceleration layer an insulating film including metal fine particles, dispersion state of the metal fine particles is uneven. Uneven dispersion state of metal fine particles is known as a cause for shortening a life of the element. A reason for this is as described below.

If the dispersion state of the metal fine particles is uneven, aggregates of the metal fine particles may easily exist in the insulating film. If the insulating film includes the aggregates of the metal fine particles, an electrically-conducting path is easily formed when a voltage is applied to an element. This causes dielectric breakdown to easily occur. Thus, a conventional electron emitting element and a device that uses this element becomes short in duration.

Moreover, if for example the conventional electron emitting element is applied to a display, the unevenness in the dispersion state of the metal fine particles causes an unevenness in brightness.

The present invention is further accomplished in view of the above problem. Another object of the present invention is to provide an electron emitting element that is capable of emitting electrons stably for a long term, which electron emitting element has conductive fine particles evenly dispersed in an electron acceleration layer.

Solution to Problem

In order to attain the objects, an electron emitting element of the present invention is an electron emitting element including: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including (a) conductive fine particles and (b) insulating fine particles whose average particle diameter is greater than that of the conductive fine particles, and $0.3x+3.9 \leq y \leq 75$, where x (nm) is the average particle diameter of the insulating fine particles, and y (nm) is a thickness of the thin-film electrode.

Moreover, in order to attain the objects, an electron emitting element of the present invention is an electron emitting element including: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including (a) conductive fine particles and (b) insulating fine particles whose primary average particle diameter is greater than that of the conductive fine particles, and if the electron acceleration layer includes aggregates of the conductive fine particles, the aggregates having an average particle diameter of 0.35 μm or less.

Advantageous Effects of Invention

As described above, the electron emitting element of the present invention has an electron acceleration layer provided between an electrode substrate and a thin-film electrode, which electron acceleration layer includes (a) conductive fine particles and (b) insulating fine particles having an average particle diameter greater than that of the conductive fine particles. Further, the electron emitting element satisfies $0.3x+3.9 \leq y \leq 75$, where x is the average particle diameter of the insulating fine particles, and y is a thickness of the thin-film electrode.

According to the configuration, an electron acceleration layer is provided between an electrode substrate and a thin-film electrode, which electron acceleration layer includes (a) conductive fine particles and (b) insulating fine particles having an average particle diameter greater than that of the conductive fine particles. Further, the thin-film electrode has a thickness y (nm) that satisfies the above relational expression. This electron acceleration layer is a thin-film layer in which insulating fine particles and conductive fine particles are minutely assembled, and the electron acceleration layer has a semiconductive property. When a voltage is applied to the semiconductive electron acceleration layer, current flow occurs in the electron acceleration layer. A part of electrons in the current becomes ballistic electrons due to an intense electric field produced by the applied voltage and the ballistic electrons are emitted.

Here, in order to cause the thin-film electrode to work properly as a planar electrode, the thin-film electrode requires having a thickness of at least $0.3x+3.9$ (nm). If the thin-film electrode is thinner than this thickness, electrical conduction cannot be ensured, thereby causing an insufficient flow of current inside the element. Moreover, in order to emit electrons from the electron emitting element through the thin-film electrode, the thin-film electrode requires having a thickness of 75 (nm) or less. If the thickness exceeds 75 nm, the amount of ballistic electrons that transmit the thin-film electrode remarkably decreases. In such a case, the ballistic electrons are absorbed by the thin-film electrode, or alternatively, the ballistic electrons are reflected by the thin-film electrode and are recaptured into the electron acceleration layer. Hence, by specifying the thickness y of the thin-film electrode with the relational expression, it is possible to ensure the electrical conduction so that a sufficient amount of current flows in the element, and thus the ballistic electrons are emitted from the thin-film electrode.

That is to say, in the configuration, the thin-film electrode that is an electrode on an electron-emitting side has a thickness modified with respect to a size of the insulating particles. Thus, the electron emitting element of the above configuration can ensure electrical conduction and sufficient flow of current inside the element. This allows stable emission of the ballistic electrons from the thin-film electrode.

Moreover, as described above, in the electron emitting element of the present invention, the electron acceleration layer includes (a) the conductive fine particles and (b) the insulating fine particles having a primary average particle diameter greater than that of the conductive fine particles, and in a case where the electron acceleration layer includes aggregates of the conductive fine particles, an average particle diameter of the aggregates is 0.35 μm or less.

According to the configuration, an electron acceleration layer is provided between the electrode substrate and the thin-film electrode. The electron acceleration layer includes (a) conductive fine particles and (b) insulating fine particles having a primary average particle diameter greater than that of the conductive fine particles. The electron acceleration layer is a layer in which the insulating fine particles and conductive fine particles are minutely assembled, and the electron acceleration layer has a semiconductive property. When a voltage is applied to the semiconductive electron acceleration layer, current flow occurs in the electron acceleration layer. A part of electrons in the current becomes ballistic electrons due to an intense electric field produced by the applied voltage and the ballistic electrons are emitted. Here, aggregates of the conductive fine particles in the electron acceleration layer have an average particle diameter of 0.35 μm or less. Although the average particle diameter of the aggregates of the conductive fine particles is greater than the primary average particle diameter of the conductive fine particles, by keeping the average particle diameter as 0.35 μm or less, no aggregate that would cause dielectric breakdown is generated in the electron acceleration layer, as apparent in the Example later described. Hence, is possible to say that the conductive fine particles are evenly dispersed in the electron acceleration layer.

Conventionally, the conductive fine particles could not be dispersed in the electron acceleration layer in an even manner. However, as described above, the electron emitting element according to the present invention has the conductive fine particles evenly dispersed in the electron acceleration layer. This extends a life of the element, and therefore electron emitting element can stably emit the electron for a long term.

DESCRIPTION OF EMBODIMENTS

The following specifically explains Embodiments and Examples of an electron emitting element of the present invention, with reference to FIGS. 1 to 20. Note that Embodiments and Examples described below are merely specific examples of the present invention and by no means limit the present invention.

Embodiment 1

Figure 1:
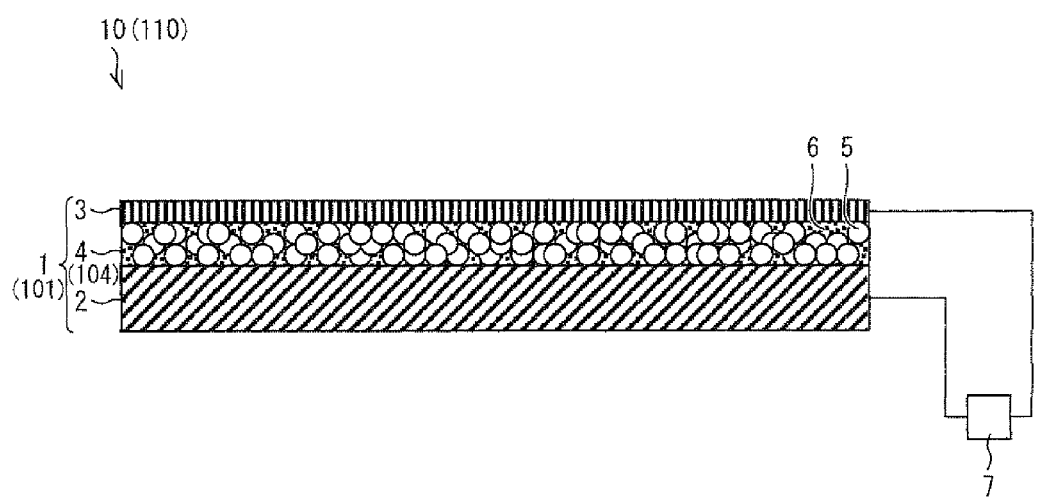
FIG. 1 is a schematic view illustrating a configuration of an electron emitting device including an electron emitting element according to Embodiment 1 or Embodiment 2 of the present invention.

FIG. 1 illustrates a configuration of an electron emitting device of Embodiment 1 including an electron emitting element according to the present invention. As illustrated in FIG. 1, an electron emitting element 1 of the present embodiment includes an electrode substrate 2 serving as a lower electrode, a thin-film electrode 3 serving as an upper electrode, and an electron acceleration layer 4 sandwiched between the electrode substrate 2 and the thin-film electrode 3. Further, the electrode substrate 2 and the thin-film electrode 3 are connected to a power supply 7, so that a voltage can be applied between the electrode substrate 2 and the thin-film electrode 3 which are provided so as to face each other. The electron emitting element 1 applies a voltage between the electrode substrate 2 and the thin-film electrode 3 so that current flows between the electrode substrate 2 and the thin-film electrode 3, that is, in the electron acceleration layer 4. A part of electrons in the current are caused to transmit through the thin-film electrode 3 and/or be emitted through gaps in the thin-film electrode 3 as ballistic electrons due to an intense electric field formed by the applied voltage. The electron emitting element 1 and the power supply 7 constitute an electron emitting device 10.

The electrode substrate 2 serving as the lower electrode also acts as a supporting member of the electron emitting element. Accordingly, the electrode substrate 2 is not specifically limited in material as long as the material has a sufficient strength, excellent adhesiveness with respect to a substance in direct contact with the material and sufficient electrical conductivity. Examples of the electrode substrate include: metal substrates made of, for example, SUS, Ti, and Cu; semiconductor substrates made of, for example, Si, Ge, and GaAs; insulator substrates such as a glass substrate; and plastic substrates. In cases where an insulator substrate such as a glass substrate is used, an electrically conductive material such as metal is attached, as an electrode, to an interface of the insulator substrate and the electron acceleration layer 4 so that the insulator substrate can be used as the electrode substrate 2 that serves as the lower electrode. A constituent material of the electrically conductive material is not specifically limited as long as a thin film of a material excellent in electric conductivity can be formed by magnetron sputtering or the like. Note that, if a steady operation of the electron emitting element in the atmosphere is desired, a conductor having a high resistance to oxidation is preferably used and noble metal is more preferably used for the constituent material. An ITO thin-film which is widely used as an electrically conductive oxide material for a transparent electrode is also applicable. Alternatively, it is possible to use, as the lower electrode, a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 that serves as the upper electrode is for applying a voltage in the electron acceleration layer 4. Accordingly, a material of the thin-film electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

Further, a film thickness of the thin-film electrode 3 is a very important factor for causing efficient emission of electrons from the electron emitting element 1 to the outside. It is apparent from an experiment described in Example later described that in the present embodiment, the following relational expression (1) is preferably satisfied:

$$0.3x+y \leq 75 \quad (1),$$

where x (nm) is a particle diameter of insulating fine particles 5 later described, and y (nm) is a thickness of a thin-film electrode 3.

Furthermore, the following relational expression (2) is preferably satisfied:

$$0.3x+3.9 \leq y \leq 60 \quad (2).$$

The minimum film thickness of the thin-film electrode 3 is (0.3x+3.9) nm, for causing the thin-film electrode 3 to work properly as a planar electrode. A film thickness of less than (0.3x+3.9) nm cannot ensure electrical conduction. On the other hand, the maximum film thickness of the thin-film electrode 3 is 75 nm, for emitting electrons from the electron emitting element 1 to the outside. In a case where the film thickness is more than 75 nm, ballistic electrons do not pass through the thin-film electrode 3. In such a case, the ballistic electrons are absorbed by the thin-film electrode 3, or the ballistic electrons are reflected back by the thin-film electrode 3 and recaptured in the electron acceleration layer 4.

Hence, if the relational expression (1), further preferably the relational expression (2) is satisfied, electrical conduction of the electron emitting element 1 is ensured and a sufficient amount of current flows in the element. This makes it possible to stably emit the ballistic electrons from the thin-film electrode 3.

Figure 2:
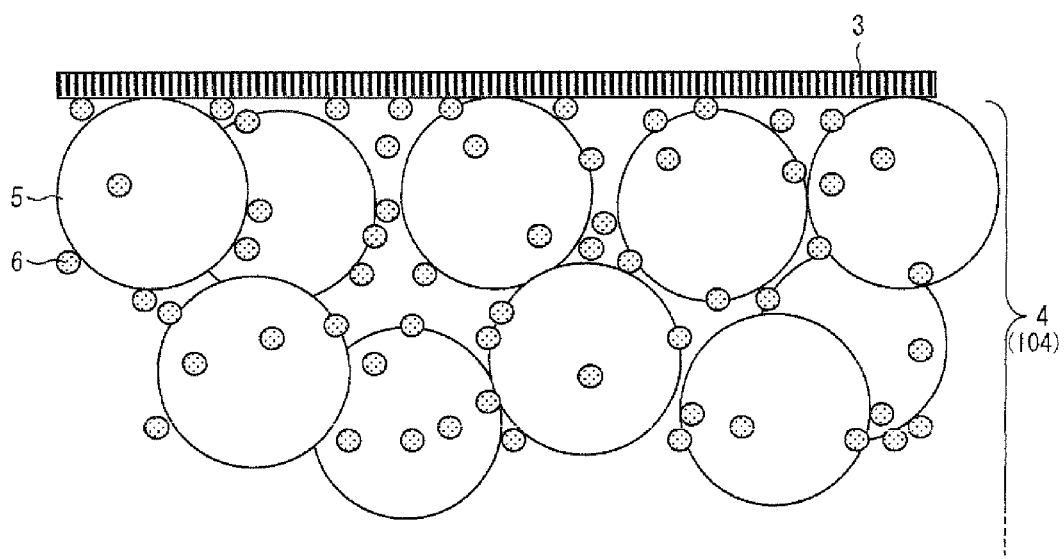
FIG. 2 is an enlarged view of the vicinity of an electron acceleration layer in the electron emitting element of FIG. 1.

The electron acceleration layer 4, as illustrated in FIG. 2, includes (a) conductive fine particles 6 and (b) insulating fine particles 5 having an average particle diameter greater than that of the conductive fine particles 6. Therefore, the electron acceleration layer 4 may also be called a fine particles layer 4.

The conductive fine particles 6 can be made of any kind of conductor, in view of an operation principle for generating ballistic electrons. However, if the material is a conductor having a high resistance to oxidation, oxidation degradation at the time of an operation under the atmospheric pressure can be prevented. In this patent application, to have a high resistance to oxidation means to have a small oxide formation reaction. In general, according to a thermodynamic calculation, when a value of a change ΔG [kJ/mol] in free energy of oxide formation is negative and greater, the oxide formation reaction occurs more easily. In the present invention, a metal element whose ΔG is equal to or greater than −450 [kJ/mol] is considered to be the conductive fine particles having a high resistance to oxidation. Further, the conductive fine particles having a high resistance to oxidation also include conductive fine particles whose oxide formation reaction is made difficult to occur by attaching an insulating material smaller than the conductive fine particles to the conductive fine particles or by coating the conductive fine particles with use of such an insulating material. The conductive fine particles having a high resistance to oxidation makes it possible to prevent element degradation such as oxidation caused by oxygen in the atmosphere. This makes it possible to extend a life of the electron emitting element.

Examples of materials of the conductive fine particles that have a high resistance to oxidation are noble metal such as gold, silver, platinum, palladium, and nickel. The conductive fine particles 6 can be produced by using a known fine particle production method such as a sputtering method or a spray heating method. It is also possible to use commercially available conductive fine particle powder such as silver nanoparticles manufactured and marketed by Applied Nano Particle Laboratory Co. A principle of generating ballistic particles will be described later.

In the present embodiment, because control of electric conductivity is required, an average particle diameter of the conductive fine particles 6 has to be smaller than that of the insulating fine particles 5. The conductive fine particles 6 preferably have an average particle diameter in a range of 3 nm to 10 nm. In a case where, as described above, the average particle diameter of the conductive fine particles 6 is arranged to be smaller than that of the insulating fine particles 5 and preferably in a range of 3 nm to 10 nm, a conductive path made of the conductive fine particles 6 is not formed in the electron acceleration layer 4. As a result, dielectric breakdown becomes difficult to occur in the electron acceleration layer 4. The principle has a lot of unexplained points; however, the ballistic electrons are efficiently generated by use of the conductive fine particles 6 whose average particle diameter is within the above range.

Note that a conductive fine particle 6 may be surrounded by a small insulating material that is an insulating material whose size is smaller than the conductive fine particle 6. This small insulating material can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating ballistic electrons, any insulating material can be used as the small insulating material. However, in a case where the insulating material whose size is smaller than that of the conductive fine particle 6 is the insulating coating film coating the surface of the conductive fine particle 6 and an oxide film of the conductive fine particle 6 is used as the insulating coating film, a thickness of the oxide film may be increased to a thickness greater than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

Regarding the insulating fine particles 5, a material of the insulating fine particles 5 is not specifically limited as long as the material has an insulating property. For example, $SiO_2$, $Al_2O_3$, and $TiO_2$ are practically used. However, in a case where surface-treated silica particles having a small particle diameter are used, a surface area of the surface-treated silica particles is increased in a dispersion solution (solution) and viscosity of the dispersion solution (solution viscosity) increases as compared to a case where spherical silica particles having a particle diameter greater than that of the surface-treated silica particles are used. As a result, a thickness of the electron acceleration layer 4 tends to increase slightly. Further, fine particles made of an organic polymer can be used as the material of the insulating fine particles 5. Examples of such fine particles that can be used are cross-linked fine particles (SX 8743) made of styrene/divinylbenzene manufactured and marketed by JSR Corporation, or Fine Sphere series which are styrene acryl fine particles manufactured and marketed by NIPPON PAINT C.

In the present embodiment, particles that may be used as the insulating fine particles 5 include (i) two or more different kinds of particles, (ii) particles having different peaks in diameter, or (iii) one kind of particles whose distribution of diameters is broad.

The insulating fine particles 5 preferably have a diameter greater than that of the conductive fine particles 6 so that the insulating fine particles 5 has a heat dissipation effect superior to that of the conductive fine particles 6. The diameter (average particle diameter) of the insulating fine particles 5 is preferably at least 10 nm, and more preferably in a range of 12 nm to 110 nm. In such a case, diameters of the fine particles may be broadly distributed with respect to the average particle diameter. For example, insulating fine particles having an average particle diameter of 50 nm may have particle diameter distribution in a range of 20 nm to 100 nm.

Moreover, a ratio by weight of the insulating fine particles 5 in all the fine particles constituting the electron acceleration layer 4 is preferably in a range of 80% to 95%.

The thinner the electron acceleration layer 4 is, the more intense the electric field becomes. Therefore, even by a low voltage application, electrons can be accelerated in the case where the electron acceleration layer 4 is thin. However, it is preferable that the electron acceleration layer 4 has a thickness in a range of 12 nm to 6000 nm, and more preferably 300 nm to 6000 nm. This is because the thickness of the electron acceleration layer 4 in the above range makes it possible (i) to make a layer thickness of the electron acceleration layer even and (ii) to control a resistance of the electron acceleration layer in a layer thickness direction.

The following explanation deals with a principle of the electron emission. FIG. 2 is a schematic view magnifying the vicinity of the electron acceleration layer 4 in the electron emitting element 1. As illustrated in FIG. 2, the electron acceleration layer 4 is made mostly of the insulating fine particles 5, and the conductive fine particles 6 are scattered in gaps between the insulating fine particles 5. The insulating fine particles 5 and the conductive fine particles 6 are included in the electron acceleration layer 4 in FIG. 2 to be in such a ratio that a ratio by weight of the insulating fine particles 5 is 80% with respect a total weight of the insulating fine particles 5 and conductive fine particles 6. The number of conductive fine particles 6 that are attached to one particle of the insulating fine particles 5 is about 6 particles.

Since the electron acceleration layer 4 is made of the insulating fine particles 5 and a small number of conductive fine particles 6, the electron acceleration layer 4 has a semiconductive property. Therefore, a voltage application to the electron acceleration layer 4 causes very weak current flow. A volt-ampere characteristic of the electron acceleration layer 4 shows a so-called varistor characteristic, and a current value sharply increases as an applied voltage increases. A part of electrons in the current become ballistic electrons due to an intense electric field formed within the electron acceleration layer 4 by the applied voltage. The ballistic electrons are emitted to the outside of the electron emitting element 1 by transmitting though the thin-film electrode 3 and/or through gaps in the thin-film electrode 3. A generation process of the ballistic electrons has not been determined, but it is considered that the ballistic electrons are generated by simultaneous acceleration and tunneling of electrons in a direction of an electric field.

The following explanation deals with an embodiment of a method for producing the electron emitting element 1.

First, a dispersion solution in which the insulating fine particles 5 and conductive fine particles 6 are dispersed is applied on the electrode substrate 2 by spin coating, so as to form an electron acceleration layer 4. In the present embodiment, a solvent used in the dispersion solution is not specifically limited as long as the insulating fine particles 5 and conductive fine particles 6 can be dispersed in the solvent, and the solvent can be dried after the application. Examples of the solvent are toluene, benzene, xylene, hexane, and tetradecane. Moreover, alcoholate processing may be carried out as a pretreatment, in order to improve dispersibility of the conductive fine particles 6. A predetermined film thickness can be obtained by repeating, a plurality of times, (i) film formation by the spin coating method and (ii) drying.

Other than the spin coating method, the electron acceleration layer 4 can be formed by, for example, a dropping method or a spray coating method. Then, the thin-film electrode 3 is formed on the electron acceleration layer 4. For forming the thin-film electrode 3, a magnetron sputtering method can be used, for example. The thin-film electrode 3 may be formed by, for example, an ink-jet method, a spin coating method, or a vapor deposition method.

Example of Embodiment 1

The present example explains an experiment in which current measurement was carried out by use of electron emitting elements according to Embodiment 1. Note that this experiment is merely an example of the present embodiment and by no means limits the present invention.

First, electron emitting elements of Examples (Ex.) 1 to 9 and electron emitting elements of Comparative Examples (C. Ex.) 1 to 5 were prepared. The electron emitting elements of Examples 1 to 9 and Comparative Examples 1 to 5 were prepared to have the insulating particles 5 (silica particle diameter) and the thickness of the thin-film electrode 3 (surface electrode film thickness) as shown in Table 1 below. The following description deals with a method for preparing the electron emitting elements of Examples 1 to 9 and Comparative Examples 1 to 5.

The electron emitting element of Example 1 was prepared as follows. First, 3 mL of hexane solvent was supplied into a 10 mL reagent bottle, and then 0.5 g of spherical silica particles having an average diameter of 110 nm were added thereto as the insulating fine particles 5. The reagent bottle was then set in an ultrasonic dispersion device, to disperse the silica particles. Next, 0.125 g (solid content weight) of silver nanoparticle colloidal solution (hexane dispersion solution including silver fine particles having an average particle diameter of 4.5 nm, a fine particles solid content concentration: 37%) manufactured by Applied Nanoparticle Laboratory Co. was additionally supplied into the mixture as the conductive fine particles 6. The ultrasonic dispersion process was carried out again in the same manner as the first time, to obtain a fine particle dispersion solution A. A ratio by weight of the insulating fine particles 5 with respect to a total mass of the insulating fine particles 5 and conductive fine particles 6 in the fine particle dispersion solution A was 80%.

Next, the fine particle dispersion solution A was deposited on a 30 mm square SUS substrate by a spin coating method as the electrode substrate 2, so as to form the electron acceleration layer 4.

On a surface of the electron acceleration layer 4, a thin-film electrode 3 was formed by using a magnetron sputtering device, and thereby the electron emitting element of Example 1 was obtained. Gold was used as a material for forming the thin-film electrode 3. A thickness (surface electrode film thickness) of the thin-film electrode 3 was 40 nm and an area thereof was 0.014 cm$^2$.

The electron emitting elements of Example 2, 6, 9, and Comparative Examples 1 to 5 were prepared as with the electron emitting element of Example 1. However, average diameters of the spherical silica particles used as the insulating fine particles 5 were made different from Example 1, as shown in Table 1 below. More specifically, Examples 2, 6, 9, and Comparative Examples 1 to 5 had average diameters of 50 nm, 85 nm, 50 nm, 50 nm, 50 nm, 50 nm, 110 nm, and 50 nm, respectively. Moreover, the thin-film electrodes 3 of Examples 2, 6, 9, and Comparative Examples 1 to 5 were made to have film thicknesses (surface electrode film thickness) of 30 nm, 40 nm, 75 nm, 5 nm, 10 nm, 15 nm, 15 nm, and 90 nm, respectively.

The electron emitting element of Example 3 was prepared as follows. First, 2.0 g of ethanol solvent and 0.5 g of tetramethoxysilane (manufactured by Shin-Etsu Chemical Co., Ltd.) were supplied into a 10 mL reagent bottle, and thereafter 0.5 g of spherical silica particles AEROSIL R8200 (manufactured by Evonik Degussa Japan Co., Ltd., average particle diameter: 12 nm) were added as the insulating fine particles 5. The reagent bottle was then set in an ultrasonic dispersion device, so that an insulating fine particles-containing resin binder dispersion solution B was prepared. A content of the insulating material in the insulating fine particles-contained resin binder dispersion solution B was 17% by weight. Thereafter, the obtained insulating fine particles-contained resin binder dispersion solution B was mixed with a conductive fine particle solution that includes silver nanoparticles as the conductive fine particles 6. The conductive fine particle solution used in the present example was a silver nanoparticle-containing hexane dispersion solution (manufactured by Applied Nanoparticle Laboratory Co., average particle diameter of silver fine particles: 4.5 nm, solid content concentration of silver fine particles: 7%) C. To 1.0 g of the insulating fine particle-containing resin binder dispersion solution B, 1.0 g of the silver nanoparticle-containing hexane dispersion solution C was added, and the solutions were stirred at a normal temperature so that an insulating material and conductive fine particle mixture solution D was obtained. A content of the conductive fine particles in the mixed solution D was 4.5% by weight.

After the mixture solution D obtained as described above was dropped on a 30 mm square SUS substrate as the electrode substrate 2, an insulating material and conductive fine particle-containing resin binder was deposited by spin coating at 8000 rpm for 10s. As a result, the electron acceleration layer 4 was obtained.

On a surface of the electron acceleration layer 4, a thin-film electrode (surface electrode) 3 was formed by using a magnetron sputtering device, and thereby the electron emitting element of Example 3 was obtained. In the embodiment, gold was used as a material for forming the thin-film electrode 3. A thickness (surface electrode film thickness) of the thin-film electrode 3 was 15 nm, and an area thereof was 0.014 cm$^2$.

The electron emitting elements of Examples 4, 5, 7, and 8 were prepared as with the electron emitting element of Example 3. However, the film thicknesses (surface electrode film thickness) of the thin-film electrodes 3 were made different from Example 3, as shown in Table 1 below. More specifically, the electron emitting elements of Examples 4, 5, 7, and 8 had film thicknesses of 45 nm, 60 nm, 75 nm, and 10 nm, respectively.

Figure 3:
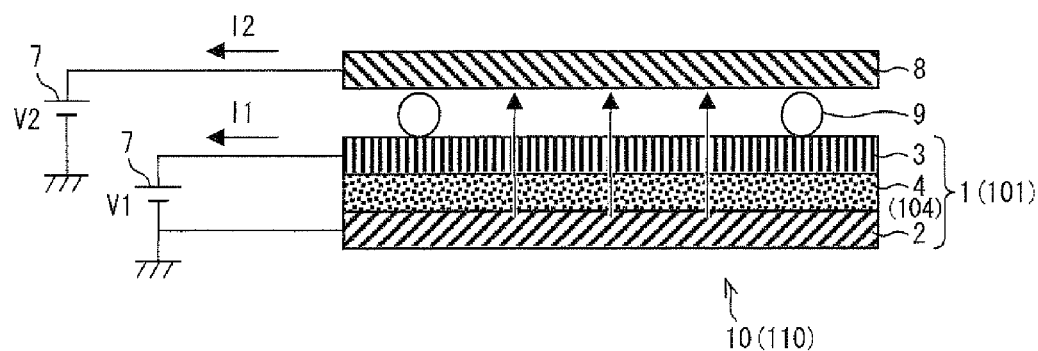
FIG. 3 is a diagram illustrating an experiment system used in measurement of electron emission current.

An experiment was carried out on the electron emitting elements of Examples 1 to 9 and Comparative Examples 1 to 5 each prepared as described above. In the experiment, electron emission current per unit area was measured by using an experiment system as shown in FIG. 3. In the experiment system of FIG. 3, a counter electrode 8 was provided on a side of the thin-film electrode 3 of the electron emitting element 1 so that the counter electrode 8 and the thin-film electrode 3 sandwiched an insulating spacer 9. Each of the electron emitting element 1 and the counter electrode 8 was connected to a power supply 7 so that a voltage V1 was applied to the electron emitting element 1 and a voltage V2 was applied to the counter electrode 8. The above experiment system was set up in vacuum at $1 \times 10^{-8}$ ATM and an electron emission experiment was carried out. In each experiment, V1 was set to be the value in "voltage" shown in the following Table, and V2 was set as 100V. Moreover, a distance via the insulating spacer 9 between the electron emitting element and the counter electrode was set to 5 mm.

Table 1 shows an experiment result of measuring a silica particle diameter (particle diameter of insulating fine particles), surface electrode film thickness (film thickness of thin-film electrode), and electron emitting current per unit area, for each of the electron emitting elements used in the experiment.

TABLE 1

|  |  | Ex. 1 | Ex. 2 | Ex. 3 | Ex. 4 | Ex. 5 |
|---|---|---|---|---|---|---|
| Silica particle diameter | [nm] | 110 | 50 | 12 | 12 | 12 |
| Surface electrode film thickness | [nm] | 40 | 30 | 15 | 45 | 60 |
| Element properties | Voltage [V] | 18.8 | 20.8 | 24.6 | 32.4 | 29.1 |
|  | Current [mA/cm$^2$] | 0.535 | 0.202 | 0.127 | 0.604 | 0.195 |
|  | Evaluation | G | G | G | G | G |

TABLE 1-continued

|  |  | Ex. 6 | Ex. 7 | Ex. 8 | Ex. 9 |
|---|---|---|---|---|---|
| Silica particle diameter | [nm] | 85 | 12 | 12 | 50 |
| Surface electrode film thickness | [nm] | 40 | 75 | 10 | 75 |
| Element properties | Voltage [V] | 19.8 | 29.9 | 14.2 | 15.8 |
|  | Current [mA/cm$^2$] | 0.740 | 0.018 | 0.027 | 0.058 |
|  | Evaluation | G | S | S | S |

|  |  | C. Ex. 1 | C. Ex. 2 | C. Ex. 3 | C. Ex. 4 | C. Ex. 5 |
|---|---|---|---|---|---|---|
| Silica particle diameter | [nm] | 50 | 50 | 50 | 110 | 50 |
| Surface electrode film thickness | [nm] | 5 | 10 | 15 | 15 | 90 |
| Element properties | Voltage [V] |  |  |  |  |  |
|  | Current [mA/cm$^2$] | — | — | — | — | — |
|  | Evaluation | P | P | P | P | P |

In the evaluation of Table 1, the electron emitting elements that exhibited an electron emission current of 0.1 m/cm$^2$ or more were evaluated as Good (G), the electron emitting elements that exhibited an electron emission current of less than 0.1 m/cm$^2$ were evaluated as Satisfactory (S), and the electron emitting elements that exhibited no electron emission were evaluated as Poor (P).

Figure 4:
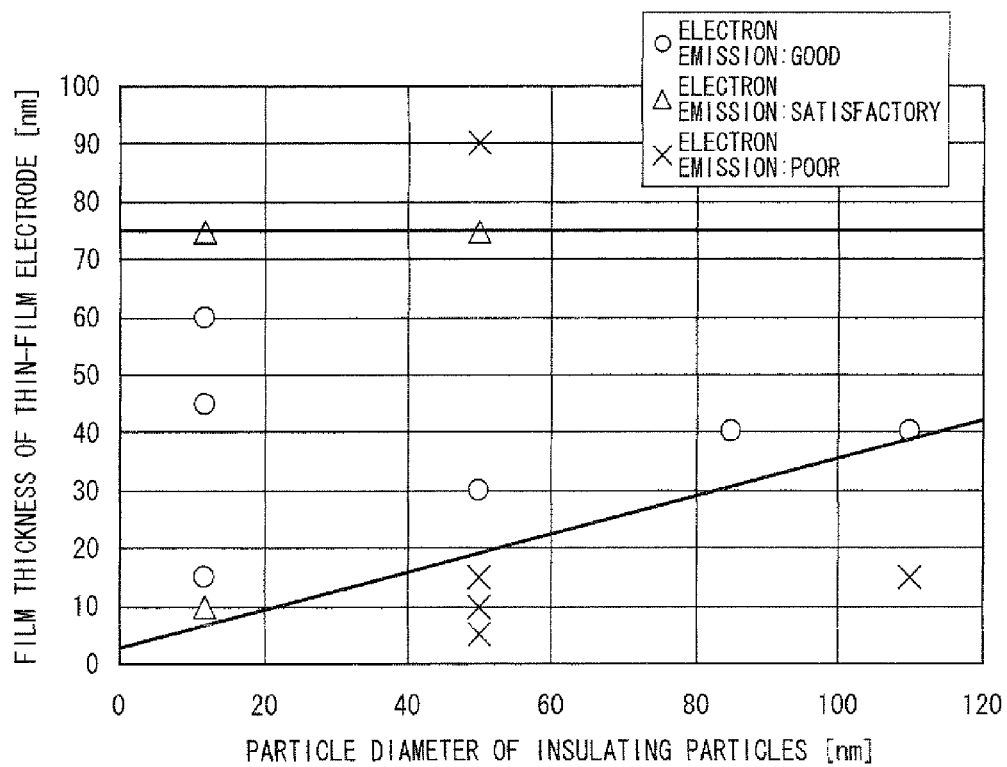
FIG. 4 is a diagram illustrating a relationship between a particle diameter of insulating particles and a film thickness of a thin-film electrode.

FIG. 4 is a graph illustrating a relationship between (i) the silica particle diameter, (ii) the surface electrode film thickness, and (iii) the experiment results of each of the electron emitting elements, each shown in Table 1. It is apparent from FIG. 4 that the following relational expression (1) is preferably satisfied:

$$0.3x+3.9 \leq y \leq 75 \quad (1),$$

where x (nm) is the average particle diameter of the insulating fine particles 5, and y (nm) is the thickness of the thin-film electrode 3.

Furthermore, it is apparent that the following relational expression (2) is preferably satisfied:

$$0.3x+3.9 \leq y \leq 60 \quad (2).$$

Embodiment 2

FIG. 1 illustrates a configuration of an electron emitting device of Embodiment 2, which includes the electron emitting element according to the present invention. As illustrated in FIG. 1, an electron emitting element 101 of the present embodiment includes an electrode substrate 2 serving as a lower electrode, a thin-film electrode 3 serving as an upper electrode, and an electron acceleration layer 104 sandwiched between the electrode substrate 2 and the thin-film electrode 3. Further, the electrode substrate 2 and the thin-film electrode 3 are connected to a power supply 7 so that a voltage can be applied between the electrode substrate 2 and the thin-film electrode 3 which are provided so as to face each other. The electron emitting element 101 and the power supply 7 constitute an electron emitting device 110.

Note that members that have identical functions to those of members described in Embodiment 1 are given the same reference signs, and the explanations thereof are omitted.

A film thickness of the thin-film electrode 3 is a very important factor for causing efficient emission of electrons from the electron emitting element 101 to the outside. In the present embodiment, the thin-film electrode 3 preferably has a film thickness in a range of 10 nm to 55 nm. The minimum film thickness of the thin-film electrode 3 is 10 nm, for causing the thin-film electrode 3 to work properly as a planar electrode. A film thickness of less than 10 nm cannot ensure electrical conduction. On the other hand, the maximum film thickness of the thin-film electrode 3 is 55 nm, for emitting electrons from the electron emitting element 101 to the outside. In a case where the film thickness is more than 55 nm, ballistic electrons do not pass thorough the thin-film electrode 3. In such a case, the ballistic electrons are absorbed by the thin-film electrode 3, or the ballistic electrons are reflected back by the thin-film electrode 3 and recaptured in the electron acceleration layer 104. Thus, with the film thickness of the thin-film electrode 3 in the range of 10 nm to 55 nm, electrical conduction of the electron emitting element 101 can be ensured, and thereby sufficient current flows inside the element. This allows stable emission of the ballistic electrons from the thin-film electrode 3.

The electron acceleration layer 104 includes (a) conductive fine particles 6 and (b) insulating fine particles 5 having a primary average particle diameter greater than that of the conductive fine particles 6. The conductive fine particles 6 are evenly dispersed in the electron acceleration layer 4, and particle diameters of aggregates of the conductive fine particles are not more than 0.35 μm.

In the present embodiment, because control of electric conductivity is required, a primary average particle diameter of the conductive fine particles 6 has to be smaller than that of the insulating fine particles 5 described below. The conductive fine particles 6 preferably have a primary average particle diameter in a range of 3 nm to 10 nm. In a case where, as described above, the primary average particle diameter of the conductive fine particles 6 is arranged to be smaller than that of the insulating fine particles 5 and preferably in a range of 3 nm to 10 nm, a conductive path made of the conductive fine particles 6 is not formed in the electron acceleration layer 104. As a result, dielectric breakdown becomes difficult to occur in the electron acceleration layer 104. The principle has a lot of unexplained points; however, the ballistic electrons are efficiently generated by use of the conductive fine particles 6 whose primary average particle diameter is within the above range. The average particle diameter of the conductive fine particles 6 may be measured by, for example, (i) dispersing the conductive fine particles in a dispersion medium at an appropriate concentration, and (ii) measuring the average particle diameter with Microtrac 9340-UPA (manufactured by Nikkiso Co., Ltd.).

Figure 12:
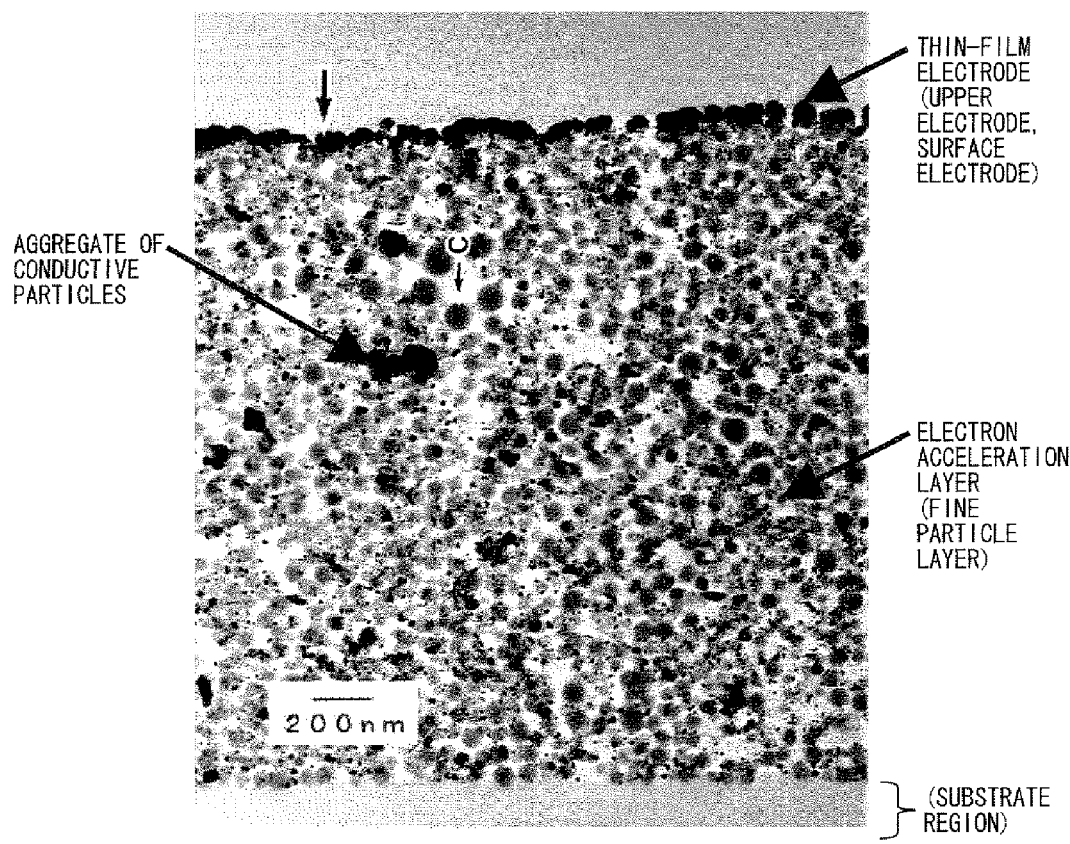
FIG. 12 is a TEM picture of an electron emitting element of Embodiment 2, illustrating that conductive fine particles are evenly dispersed.

Furthermore, as illustrated in FIG. 12, the conductive fine particles 6 are dispersed evenly in the electron acceleration layer 104. In the embodiment, "dispersed evenly" means that the average particle diameter of the aggregates of the conductive fine particles 6 in the electron acceleration layer 104 is 0.35 μm or less, as apparent in the Example described later.

An average particle diameter of the aggregates of the conductive fine particles 6 is greater than the primary average particle diameter of the conductive fine particles 6. If the average particle diameter of the aggregates is 0.35 μm or less, no aggregate of a size that causes dielectric breakdown is generated in the electron acceleration layer 104, as apparent from the Example described later. Thus, it is possible to say that the conductive fine particles 6 are dispersed evenly.

Figure 13:
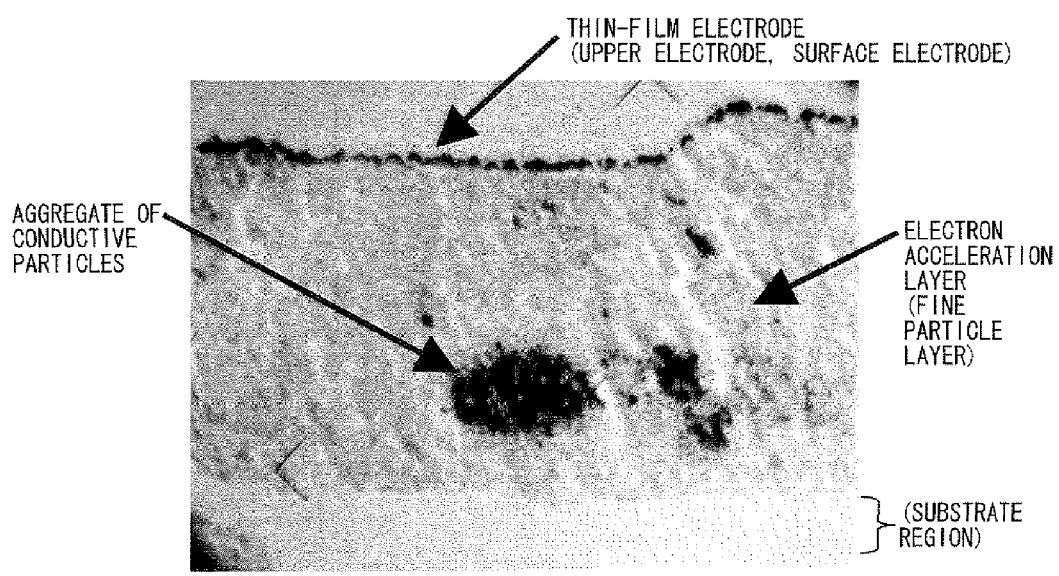
FIG. 13 is a TEM picture of an electron emitting element of Comparative Example, illustrating that conductive fine particles are unevenly dispersed.

If a dispersion state of the conductive fine particles in the electron acceleration layer (fine particle layer) is uneven as illustrated in FIG. 13, and the electron acceleration layer includes aggregates of the conductive fine particles, an electrically-conducting path may easily form when a voltage is applied to the element. In this case, the dielectric breakdown may easily occur. However, since the electron emitting element 101 has the conductive fine particles 6 dispersed evenly in the electron acceleration layer (fine particle layer) 104 as described above, it is possible to extend a life of the element. As a result, the electrons can be stably emitted for a long term.

FIG. 12 and FIG. 13 are TEM pictures. In TEM observation, a portion upper of the electron acceleration layer 104 is embedded with resin, and this embedded portion is observed after the portion is peeled off from the electrode substrate 2. Therefore, in FIG. 12 and FIG. 13, the electrode substrate 2 is not included in the picture, and a region where the electrode substrate 2 was present is shown as a substrate region.

Note that a conductive fine particle 6 may be surrounded by a small insulating material that is an insulating material whose size is smaller than the primary average particle diameter of the conductive fine particle 6.

By having a ratio by weight of the conductive fine particles 6 included in the electron acceleration layer 104 to be 30% or less, it is possible to form a thin-film semiconductive layer having high resistance, thereby realizing an electron acceleration layer 104 in which no dielectric breakdown occurs.

The insulating fine particles 5 preferably have a primary average particle diameter greater than that of the conductive fine particles 6 so that the insulating fine particles 5 has a heat dissipation effect superior to that of the conductive fine particles 6. The diameter (primary average particle diameter) of the insulating fine particles 5 is preferably in a range of 10 nm to 1000 nm, and more preferably in a range of 12 nm to 110 nm.

The thinner the electron acceleration layer 104 is, the more intense the electric field becomes. Therefore, even by a low voltage application, electrons can be accelerated in the case where the electron acceleration layer 104 is thin. However, it is preferable that the electron acceleration layer 104 has a thickness in a range of 0.5 μm to 3 μm. This is because the thickness of the electron acceleration layer 104 in the above range makes it possible (i) to make a layer thickness of the electron acceleration layer even, (ii) to control a resistance of the electron acceleration layer in a layer thickness direction, and furthermore, (iii) to emit electrons even if the aggregates (having an average particle diameter of 0.35 μm or less) of the conductive fine particles 6 are included.

The same electron emission principle as in Embodiment 1 applies to the electron emission of the present embodiment.

The following explanation deals with an embodiment a method for producing the electron emitting element 101.

First, a dispersion solution in which the insulating fine particles 5 and conductive fine particles 6 are dispersed is applied on the electrode substrate 2 by spin coating for example, to form an electron acceleration layer 104. The dispersion solution is prepared by (i) mixing a solvent in which the insulating fine particles 5 are dispersed with a nano-colloidal solution of the conductive fine particles 6, and (ii) dispersing this mixture. Note that the nano-colloidal solution of the conductive fine particles 6 is mixed with the solvent in a liquid form.

By using the nano-colloidal solution of the conductive fine particles 6 in a liquid form as such, it is possible to form an electron acceleration layer 104 in which the conductive fine particles 6 are evenly dispersed. Note that the conductive fine particles 6 in a colloid state preferably have an average particle diameter of 0.35 μm or less. By using such conductive fine particles that have the average particle diameter of 0.35 μm or less in a colloid state, dispersibility of the conductive fine particles in the electron acceleration layer 104 can be improved as described later in Example.

Examples of the nano-colloidal solution of the conductive fine particles 6 are a gold nanoparticle colloidal solution fabricated and marketed by Harima Chemicals, Inc., silver nanoparticles fabricated and marketed by Applied Nanoparticle Laboratory Co., platinum nanoparticle colloidal solution and a palladium nanoparticle colloidal solution fabricated and marketed by Tokuriki Chemical Research Co., Ltd., and nickel nanoparticle paste fabricated and marketed by IOX K.K.

Moreover, a solvent of the nano-colloidal solution of the conductive fine particles 6 is not specifically limited as long as the insulating fine particles 5 can be dispersed therein and the solvent can be dried after application of the nano-colloidal solution. Examples of the solvent are toluene, benzene, xylene, hexane, and tetradecane. The solvent used for dispersing the insulating fine particles 5 is also not specifically limited as long as the conductive fine particles 6 can be dispersed therein, and the solvent can be dried after application of the nano-colloidal solution. Examples of the solvent are toluene, benzene, xylene, hexane, and tetradecane.

A predetermined film thickness of the electron acceleration layer 104 can be obtained by repeating, a plurality of times, (i) film formation by the spin coating method and (ii) drying. The electron acceleration layer 104 can be formed by, for example, a dropping method or a spray coating method.

Moreover, the electron acceleration layer 104 may be formed by the following method. A solvent in which the insulating fine particles 5 are dispersed is applied on the electrode substrate 2 by spin coating for example, thereby forming an insulating fine particle layer. Thereafter, a nano-colloidal solution of the conductive fine particles 6 is added to the insulating fine particle layer in a liquid state, so as to form the electron acceleration layer 104. By forming the electron acceleration layer 104 as such, the nano-colloidal solution of the conductive fine particles 6 permeates in the insulating fine particle layer. This allows even dispersion of the conductive fine particles 6. As a result, it is possible to avoid the conductive fine particles from aggregating inside the solvent in which the insulating fine particles are dispersed, and therefore form an electron acceleration layer 104 in which the conductive fine particles 6 are evenly dispersed. The nano-colloidal solution may be added by not only the spin coating method but also methods such as electrostatic atomization or an ink-jet method.

After the electron acceleration layer 104 is formed, the thin-film electrode 3 is formed on the electron acceleration layer 104. For forming the thin-film electrode 3, a magnetron sputtering method can be used, for example. The thin-film electrode 3 may be formed by, for example, an ink-jet method, a spin coating method, or a vapor deposition method.

Example in Embodiment 2

The present example explains an experiment in which current measurement was carried out by use of electron emitting elements according to Embodiment 2. Note that this experiment is merely an example of the present embodiment and by no means limits the present invention. First, electron emitting elements of Examples 2-1, 2-2, and of Comparative Example 2-1 were prepared as follows. First described is a method for preparing the electron emitting elements of Examples 2-1 and 2-2.

Example 2-1

The electron emitting element of Example 2-1 was prepared as follows: First, 3 mL of hexane solvent was supplied into a 10 mL reagent bottle, and 0.5 g of spherical silica particles having an average diameter of 110 nm were added thereto as the insulating fine particles 5. The reagent bottle was then set in an ultrasonic dispersion device, to disperse the spherical silica particles. Next, 0.125 g (solid content weight) of silver nanoparticle colloidal solution (hexane dispersion solution including silver fine particles of a primary average particle diameter of 4.5 nm (measurement data provided by manufacturer at the time of delivery), a fine particles solid content concentration: 37%) manufactured, by Applied Nanoparticle Laboratory Co. was additionally supplied into the mixture as the conductive fine particles 6. The ultrasonic dispersion process was carried out again in the same manner as the first time, to obtain a fine particle dispersion solution X. A ratio by weight of the insulating fine particles 5 with respect to a total mass of the insulating fine particles 5 and conductive fine particles 6 in the fine particle dispersion solution X was 80%.

Next, the fine particle dispersion solution X was deposited on a 30 mm square SUS substrate by a spin coating method as the electrode substrate 2, so as to form the electron acceleration layer 104. A condition for forming the film by the spin coating method was to rotate the electrode substrate 2 at 500 rpm for 5 seconds, then at 3000 rpm for 10 seconds, after the dispersion solution X was dropped on the electrode substrate 2. The film forming under this condition was carried out once, to deposit one layer on the electrode substrate 2, and this layer was left to dry naturally at room temperature. A thickness of the electron acceleration layer 104 was approximately 1000 nm.

On a surface of the electron acceleration layer 4, a thin-film electrode 3 was formed by using a magnetron sputtering device, and thereby the electron emitting element of Example 2-1 was obtained. Gold was used as a material for forming the thin-film electrode 3. A thickness (surface electrode film thickness) of the thin-film electrode 3 was 40 nm. An area of the thin-film electrode was made to be 0.07 cm$^2$, by using a mask having a circular vent of a diameter of 3 mm.

Example 2-2

The electron emitting element of Example 2-2 was prepared as with the electron emitting element of Example 2-1. The electron emitting element of Example 2-2 differed from that of Example 2-1 in that aggregated silver nanoparticles that are included in the silver nanoparticles colloidal solution were used in the preparation of the electron emitting element.

The silver nanoparticle colloidal solution identical to the one in Example 2-1 was initially a hexane dispersion solution having a fine particle solid content of 37%, in which silver fine particles having a primary average particle diameter of 4.5 nm (measurement data provided by manufacturer at the time of delivery) was sufficiently dispersed. However, leaving this solution to stand causes the silver nanoparticles to aggregate and precipitate with the elapse of time. Example 2-2 used the resultant silver nanoparticles after the solution was left to stand for approximately 1 month, which silver nanoparticles included the aggregates and precipitates. A result of measuring the particle diameter of the silver nanoparticles including the aggregates and precipitates were 348 nm, as described later. Note that the silver nanoparticles colloidal solution of Example 2-1 did not aggregate, as described later.

Comparative Example 2-1

Moreover, the electron emitting element of Comparative Example 2-1 was prepared as follows. First, 3 mL of toluene solvent was supplied into a 10 mL reagent bottle, and then 0.5 g of spherical silica particles having an average particle diameter of 110 nm were added as the insulating fine particles 5. Next, the reagent bottle was placed in an ultrasonic dispersion device, so as to disperse the silica particles. Thereafter, 0.055 g of silver nanoparticles (primary average particle diameter: 10 nm, of which 1 nm is insulating coated alcoholate; dried product) that serves as conductive fine particles 6 on which their surface has insulating material attached is additionally supplied into the reagent bottle. Thereafter, the ultrasonic dispersion process was carried out in the same manner as the first time. This obtained a dispersion solution Y in which a mixed rate (ratio by weight) of the insulating fine particles (silica particles) was 90%.

The dispersion solution Y was deposited on a 30 mm square SUS substrate by a spin coating method as the electrode substrate 2, so as to form an electron acceleration layer of Comparative Example 2-1. On a surface of this electron acceleration layer, a thin-film electrode 3 was formed by using a magnetron sputtering device, and thereby obtaining the electron emitting element of Comparative Example 2-1.

A condition for forming the film by the spin coating method was to rotate the electrode substrate 2 at 500 rpm for 5 seconds, then at 3000 rpm for 10 seconds, after the dispersion solution Y was dropped on the electrode substrate 2. The film forming under this condition was repeated three times, to deposit three layers on the electrode substrate 2, and the layers were left to dry naturally at room temperature. A thickness of the electron acceleration layer of Comparative Example 2-1 was approximately 1500 nm.

After forming the electron acceleration layer on the surface of the electrode substrate 2, a thin-film electrode 3 was formed by using a magnetron sputtering device. Gold was used as a material for forming the film. A thickness of the thin-film electrode 3 was 12 nm, and an area thereof was 0.28 cm$^2$.

<Measurement of Electron Emission Current of Electron Emitting Element>

An experiment was carried out on the electron emitting elements of Examples 2-1, 2-2 and Comparative Example 2-1 prepared as above. In the experiment, electron emission current per unit area was measured by using an experiment system as shown in FIG. 3. In the experiment system of FIG. 3, a counter electrode 8 was provided on a side of the thin-film electrode 3 of the electron emitting element 2-1 so that the counter electrode 8 and the thin-film electrode 3 sandwiched an insulating spacer 9. Each of the electron emitting element 101 and the counter electrode 8 was connected to a power supply 7 so that a voltage V1 was applied to the electron emitting element 101 and a voltage V2 was applied to the counter electrode 8. The above experiment system was set up in vacuum at $1 \times 10^{-8}$ ATM and an electron emission experiment was carried out. In the electron emission experiment, V2 was 100V. Moreover, a distance via the insulating spacer 9 between the electron emitting element 101 and the counter electrode 8 was set to 5000 μm. Note that, in a vacuum measurement, there was hardly any difference in the result having V2 set in a range of 50 V to 200 V.

The electron emitting element of Example 2-1 observed an electron emission current of 1.27E-4 A/cm$^2$, where V1 was 19.3 V. The electron emitting element of Example 2-2 observed an electron emission current of 5.35E-5 A/cm$^2$, where V1 was 18.3 V. The electron emitting element of Comparative Example 2-1 observed an electron emission current of 4.92E-5 A/cm$^2$, where V1 was 28.1 V.

In the experiment, electron emission was carried out in vacuum at $1 \times 10^{-8}$ ATM. However, since conductive fine particles made of a noble metal (silver in Example) were used, electrons can also be emitted in the atmosphere.

<Measurement of Light Emission of Electron Emitting Element>

Figure 14:
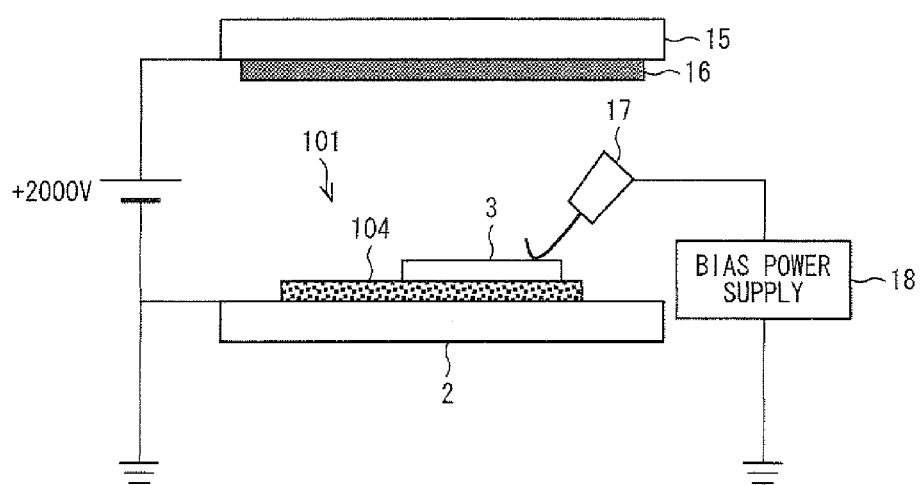
FIG. 14 is a diagram illustrating a light emitting experiment device of an electron emitting element.
Figure 15:
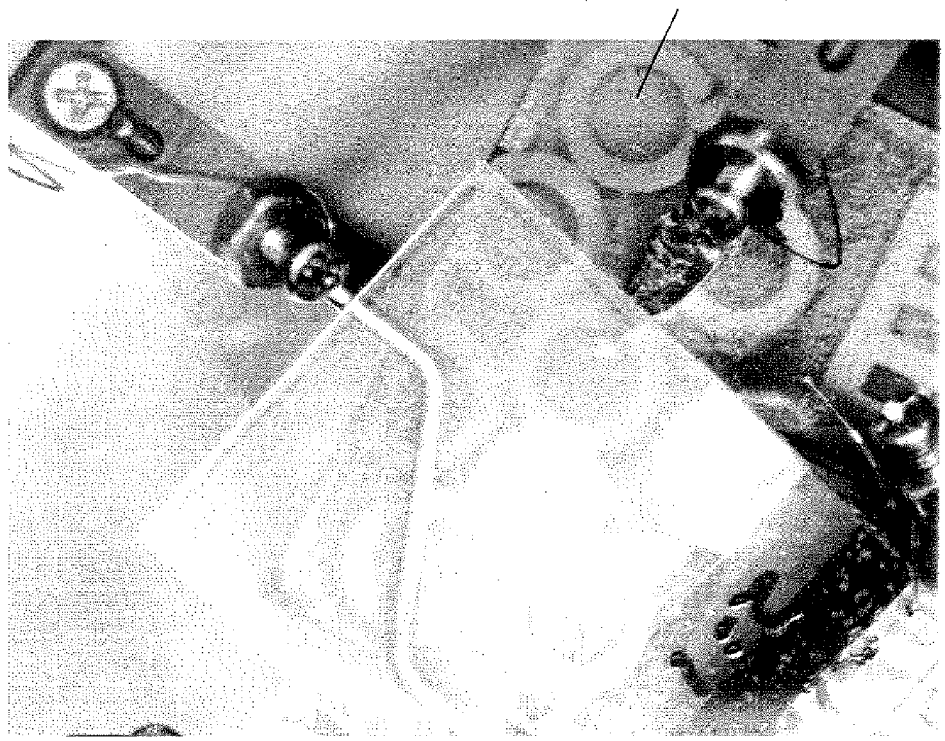
FIG. 15 is a diagram illustrating a top view picture of a light emitting experiment device of an electron emitting element.

Furthermore, a light emission experiment was carried out on the electron emitting elements 101 of Examples 2-1, 2-2, and Comparative Example 2-1, with a light emitting experiment device illustrated in FIG. 14 and FIG. 15. In a light emitting experiment device illustrated in FIG. 14, an ITO-attached glass substrate 15 was provided on a thin-film electrode 3 side of the electron emitting element 101. On a surface of the ITO-attached glass substrate 15 that faces the electron emitting element 101, a luminous body 16 was applied. Further, the ITO-attached glass substrate 15 was connected to a power supply, and a voltage of 2000 V was applied to the ITO-attached glass substrate 15. Moreover, a voltage of 15 V was applied to the electron emitting element 101, via an electrode 17 connected to a bias power supply 18. FIG. 15 is a top view (picture) of the light emitting experiment device. Such a light emitting experiment device was set in vacuum at $1 \times 10^{-8}$ ATM, so as to carry out the electron emission experiment.

Figure 16:
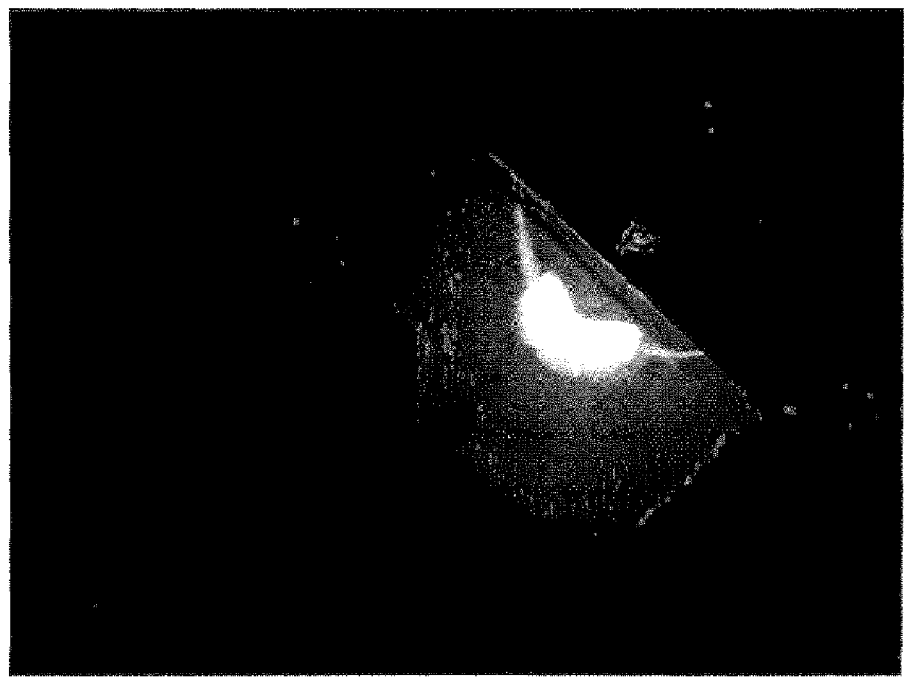
FIG. 16 is a diagram illustrating a result of a light emission experiment using a luminous body of an electron emitting element of Example 2-1.
Figure 17:
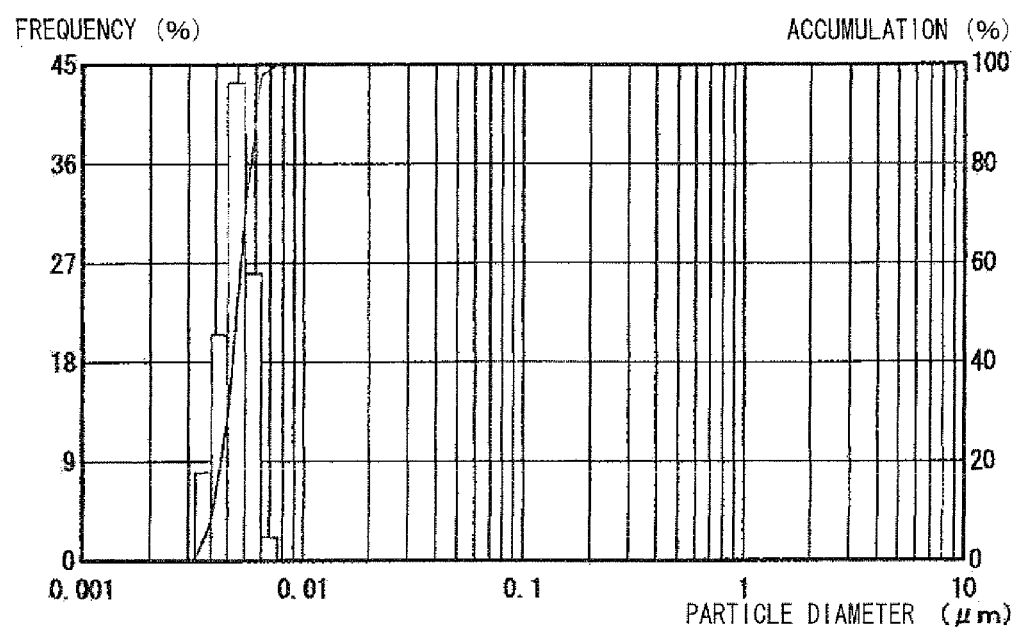
FIG. 17 is a diagram illustrating a measurement result of particle diameter distribution of conductive fine particles in an electron emitting element of Example 2-1.

A result of the light emission experiment of the electron emitting element of Example 2-1 is shown in FIG. 16. FIG. 16 is a photograph of light emission taken from above the ITO-attached glass substrate 15. It is apparent from FIG. 16 that electrodes are emitted in an even planar form. Furthermore, FIG. 17 illustrates a result of measuring a particle diameter distribution of hexane dispersion colloid of silver nanoparticles used in Example 2-1. From FIG. 17, it was found that a median diameter of a quantity particle diameter distribution was 4.9 nm (0.0049 μm), i.e., that colloids of silver nanoparticles substantially existed in their primary particle diameters.

Figure 18:
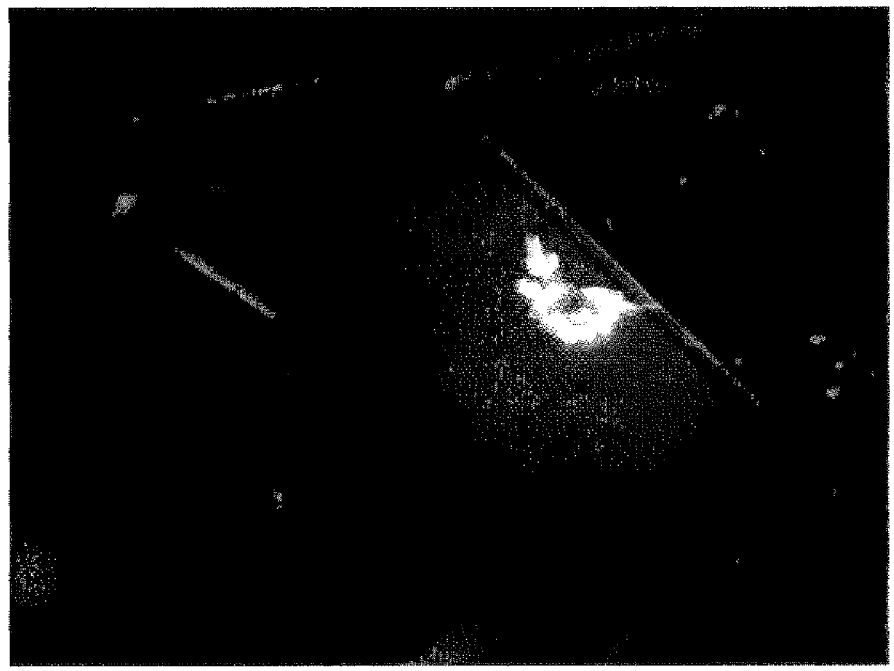
FIG. 18 is a diagram illustrating a result of a light emission experiment using a luminous body of an electron emitting element of Example 2-2.
Figure 19:
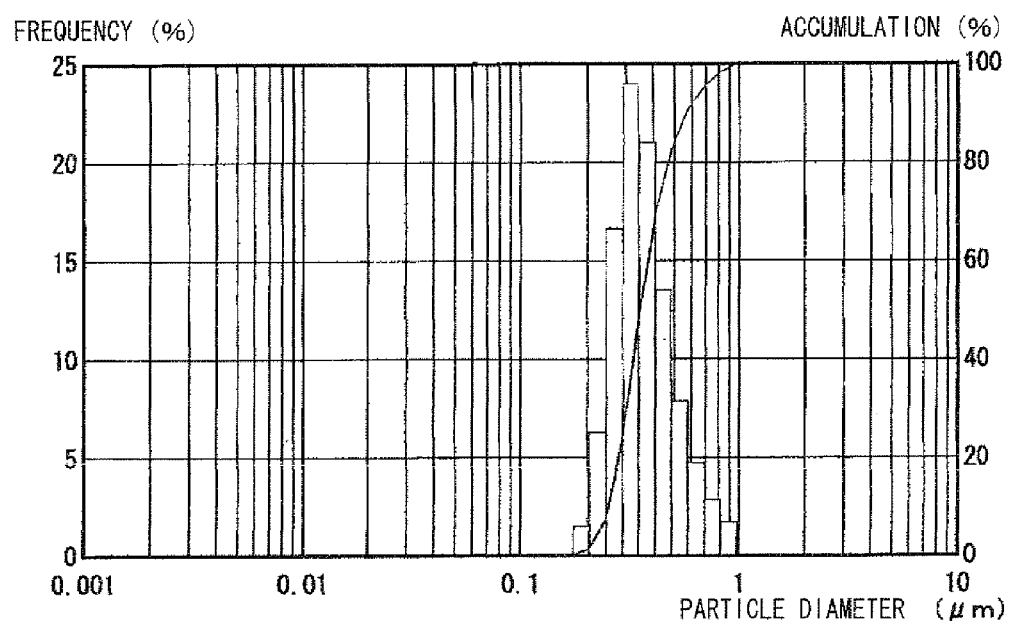
FIG. 19 is a diagram illustrating a measurement result of particle diameter distribution of conductive fine particles in an electron emitting element of Example 2-2.

A result of the light emitting experiment of the electron emitting element of Example 2-2 is shown in FIG. 18. FIG. 18 is a photograph of light emission taken from above the ITO-attached glass substrate 15. It is apparent from FIG. 18 that the electrons are emitted in an uneven planar form. Furthermore, FIG. 19 illustrates a result of measuring a particle diameter distribution of hexane dispersion colloid aggregates of silver nanoparticles used in Example 2-2. From FIG. 19, it was found that a median diameter of a quantity particle diameter distribution was 0.348 μm.

Figure 20:
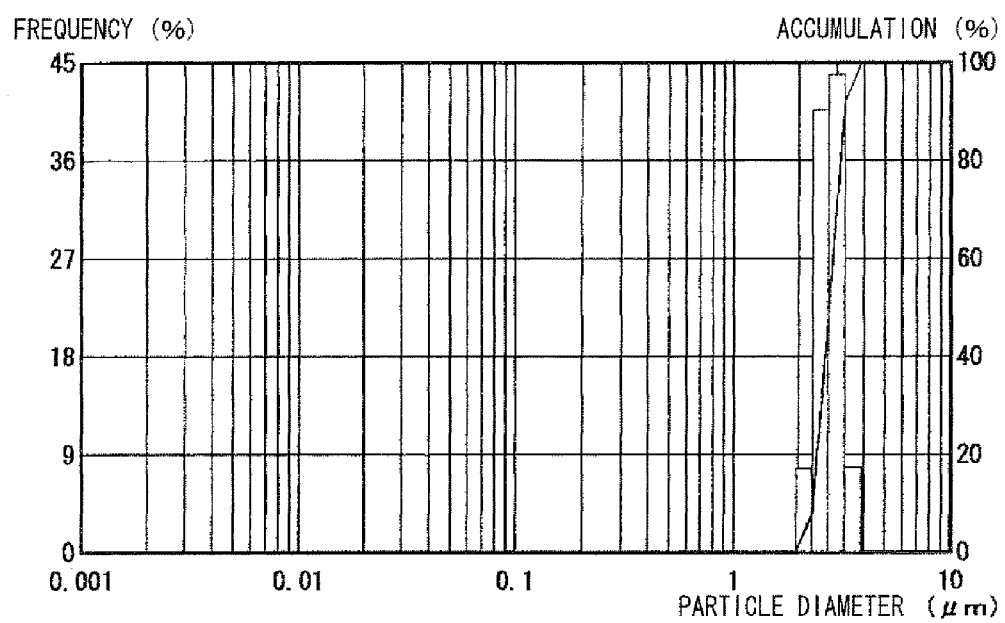
FIG. 20 is a diagram illustrating a measurement result of particle diameter distribution of conductive fine particles in an electron emitting element of Comparative Example.

Moreover, in the result of the light emitting experiment of the electron emitting element of Comparative Example 2-1, there were many electrons that exhibited emission of no electrons (there were some elements that did emit electrons among a plurality of prepared electron emitting elements). This was because a leak occurred in the electrode substrate (lower electrode) 2 and thin-film electrode (upper electrode) 3. FIG. 20 illustrates a result of measuring a particle diameter distribution of dried silver nanoparticles that were dispersed in toluene, used in Comparative Example 2-1. It was found from FIG. 20 that a median diameter of a quantity particle diameter distribution was 2.768 μm.

It is apparent from the above light emission experiments that, when the nano-colloidal solution of the conductive fine particles 6 is used in a liquid state, it is possible to form an electron acceleration layer 104 in which conductive fine particles 6 are evenly dispersed. Furthermore, it is apparent that an average particle diameter of the conductive fine particles 6 in a colloid state is preferably 0.35 μm or less, since such an average particle diameter improves dispersibility in the electron acceleration layer (fine particle layer) 104.

Furthermore, the electron emission experiment was carried out in a similar manner as described above, on an electron emitting element whose electron acceleration layer 104 was formed with (i) a fine particle dispersion solution Z that used a solvent in which hydrophilic silica particles were dispersed and (ii) a colloidal solution of platinum fine particles (a water-based dispersion solution including platinum particles having a primary average particle diameter of 10 nm; solid content concentration: 0.5%). A result thereof exhibited electron emission.

Moreover, the electron emission experiment was similarly carried out on an electron emitting element whose electron acceleration layer 104 was formed with (i) a fine particle dispersion solution Y that used a solvent in which hydrophilic silica particles were dispersed and (ii) a colloidal solution of palladium fine particles (a water-based dispersion solution including palladium particles having a primary average particle diameter of 12 nm; solid content concentration: 0.5%). A result thereof also exhibited electron emission.

Example 2-3

The electron emitting element of Example 2-3 was prepared as follows. First, 2.0 g of ethanol solvent and 0.5 g of methyl trimethoxysilane KBM-13 (manufactured by Shin-Etsu Chemical Co., Ltd.) were supplied into a 10 mL reagent bottle, and then 0.5 g of spherical silica particles AEROSIL R8200 (manufactured by Evonik Deggusa Japan Co., Ltd., average particle diameter: 12 nm) were added as the insulating fine particles 5. The reagent bottle was then set in an ultrasonic dispersion device, so that an insulating material-containing resin binder dispersion solution L was prepared. A content of the insulating fine particles 5 in the dispersion solution L was 17% by weight.

Subsequently, after the dispersion solution L obtained as described above was dropped on a 30 mm square SUS substrate as the electrode substrate 2, an insulating material-containing resin binder layer I was formed by spin coating at 3000 rpm for 10s and dried at room temperature. Because the insulating material-containing resin binder layer I does not change over time, a next process was carried out immediately after the drying.

In the next step, a gold nanoparticle-containing naphthene dispersion solution (manufactured by Harima Chemicals, Inc., average particle diameter of gold nanoparticles: 5.0 nm (measurement data as provided in catalog), solid content of gold nanoparticles: 52%) was dropped on the insulating material-contained resin binder layer I as a solution of the conductive fine particles 6. Then, the electrode substrate 2 was rotated by spin coating at 6000 rpm for 10s, thereby forming the electron acceleration layer 104. The gold nanoparticle-containing naphthene dispersion solution is a colloidal solution of the gold nanoparticies.

Thereafter, on a surface of the electron acceleration layer 104, the thin-film electrode 3 was formed by using a magnetron sputtering device, and thereby the electron emitting element of Example 2-3 was obtained. Gold was used as a material for forming the thin-film electrode 3. A thickness of the thin-film electrode 3 was 40 nm and an area thereof was 0.014 cm$^2$.

The electron emitting element of Example 2-3 was placed in vacuum at $1 \times 10^{-8}$ ATM. When an applied voltage V1 of 29.6 V was applied to the thin-film electrode, an electron emission current per unit area of 0.461 mA/cm$^2$ and a current in element of 115 mA/cm$^2$ were observed, and an electron emission efficiency was 0.40%.

The light emitting experiment was not carried out with Example 2-3. However, it is assumed that a result similar to that of the silver colloid of Example 2-1 is obtained.

Embodiment 3

Figure 5:
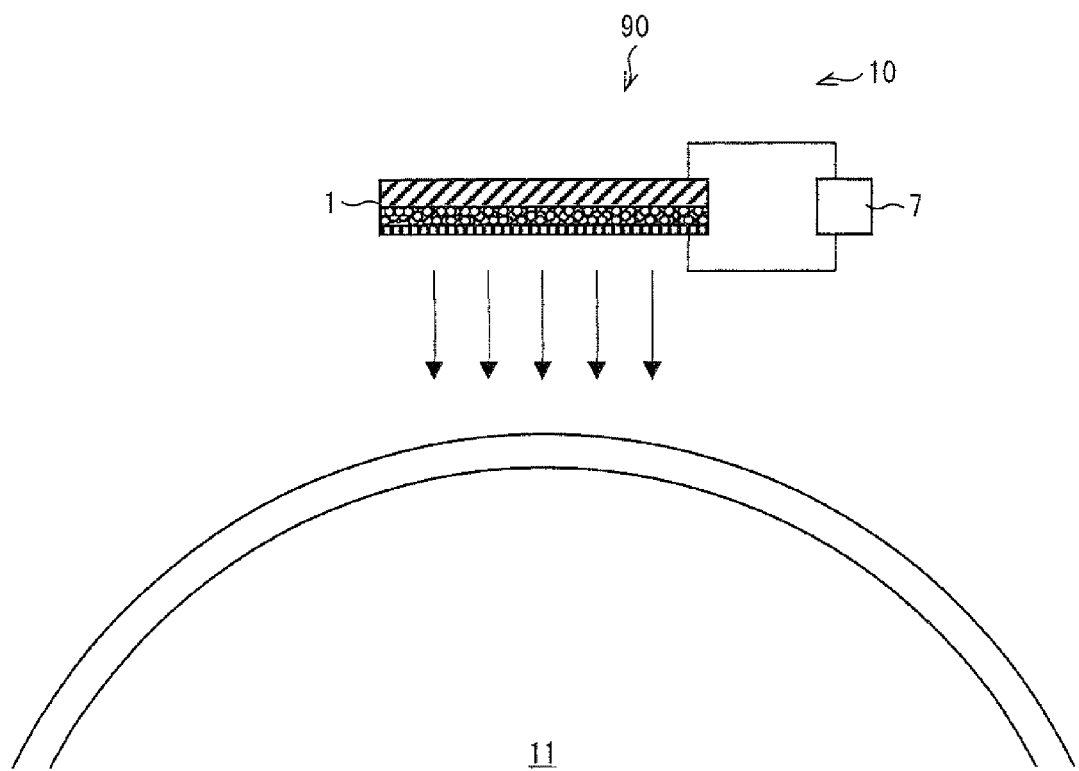
FIG. 5 is a diagram illustrating an example of a charging device including an electron emitting device of the present invention.

FIG. 5 shows an example of a charging device 90 of the present invention including an electron emitting device 10 including an electron emitting element 1 described in Embodiment 1.

Note that the charging device 90 of the present invention may employ an electron emitting device 110 of Embodiment 2.

The charging device 90 includes the electron emitting device 10 including the electron emitting element 1 and a power supply 7 for applying a voltage to the electron emitting element 1. The charging device 90 is used for electrically charging a photoreceptor 11. An image forming apparatus of the present invention includes the charging device 90. In the image forming apparatus of the present invention, the electron emitting element 1 in the charging device 90 is provided so as to face the photoreceptor 11 to be charged. Application of a voltage causes the electron emitting element 1 to emit electrons so that the photoreceptor 11 is electrically charged. In the image forming apparatus of the present invention, other than the charging device 90, known members can be used. The electron emitting element 1 in the charging device 90 is preferably provided so as to be, for example, 3 mm to 5 mm apart from the photoreceptor 11. Further, it is preferable that a voltage of approximately 25 V is applied to the electron emitting element 1. An electron acceleration layer of the electron emitting element 1 should be configured such that 1 mA/cm$^2$ of electrons are emitted per unit of time in response to application of a voltage of 25 V, for example.

If the conductive fine particles 6 are a conductor that has a high resistance to oxidation, the electron emitting device 10 which is used as the charging device 90 does not cause electric discharge even if the electron emitting device 10 is worked in the atmosphere. Therefore, the charging device 90 generates no ozone. Ozone is harmful to human bodies, and therefore regulated in various environmental standards. Even if ozone is not discharged to the outside of the apparatus, ozone deteriorates by oxidation an organic material such as the photoreceptor 11 or a belt inside the apparatus. However, such a problem can be solved by that the electron emitting element 1 of the present invention is used in the charging device 90 and further the image forming apparatus includes such a charging device 90.

Further, the electron emitting device 10 serving as the charging device 90 is configured as a planar electron source. Therefore, the electron emitting device 10 is capable of charging the photoreceptor 11 on an area that has a width in a rotation direction. This provides many chances for charging a section of the photoreceptor 11. Therefore, the charging device 90 can perform a more uniform electric charging as compared to a wire charging device electrically charging line by line a section on the photoreceptor 11. Further, the charging device 90 has an advantage such that the applied voltage is approximately 10 V which is far lower than that of a corona discharge device which requires an applied voltage of a few kV.

Embodiment 4

Figure 6:
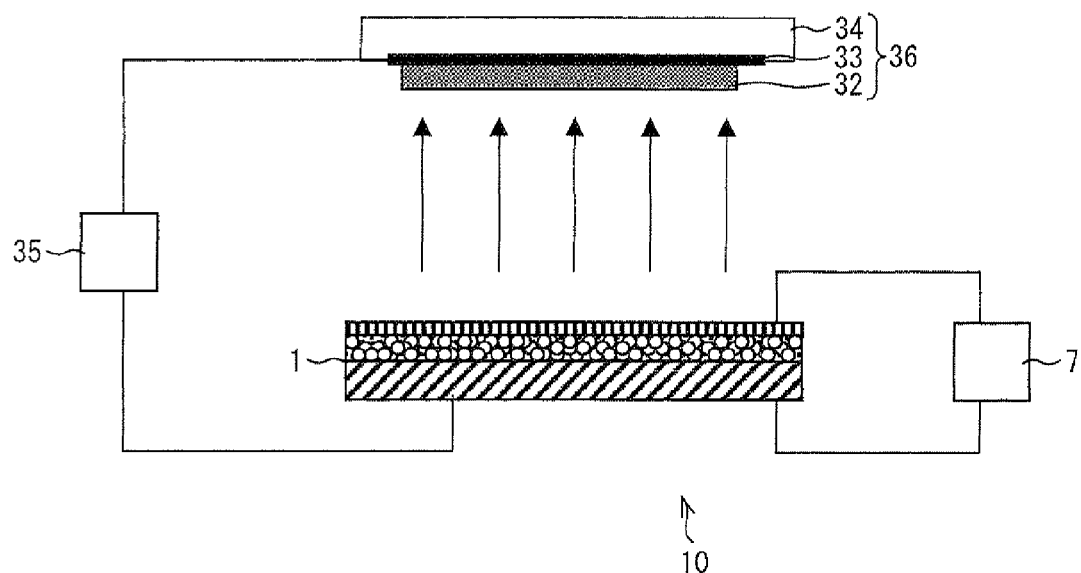
FIG. 6 is a diagram illustrating an example of a light emitting device including an electron emitting device of the present invention.
Figure 7:
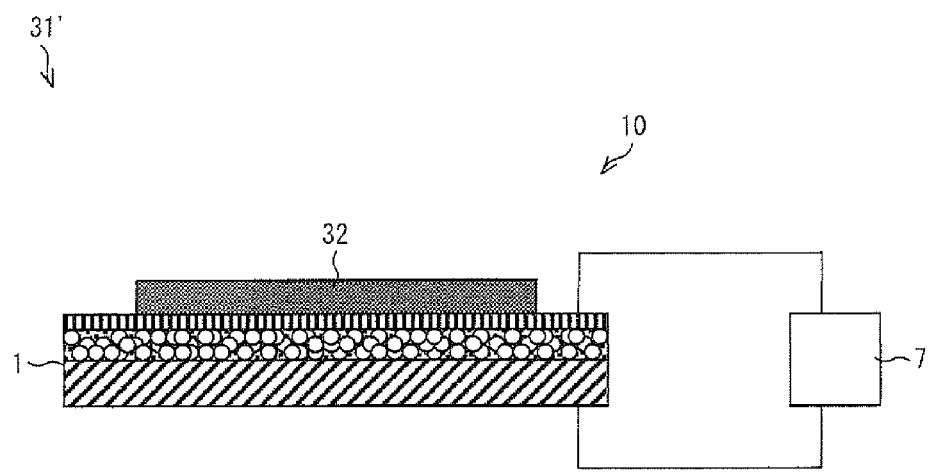
FIG. 7 is a diagram illustrating another example of a light emitting device including an electron emitting device of the present invention.
Figure 8:
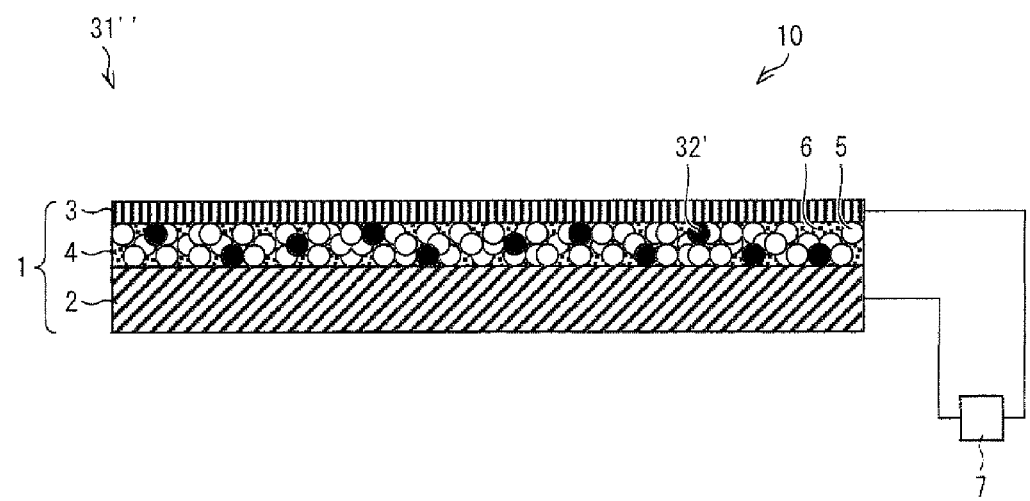
FIG. 8 is a diagram illustrating still another example of a light emitting device including an electron emitting device of the present invention.

FIG. 6 through FIG. 8 show examples of respective light emitting devices 31, 31' and 31" of the present invention each including an electron emitting device 10 including an electron emitting element 1 which is described in Embodiment 1.

Note that each of the light emitting devices 31, 31' and 31" of the present invention may employ an electron emitting device 110 of Embodiment 2.

The light emitting device 31 illustrated in FIG. 6 includes the electron emitting device 10 including an electron emitting element 1 and a power supply 7 for applying a voltage to the electron emitting element 1, and a light-emitting section 36 having a laminated structure including a glass substrate 34 as a base material, an ITO film 33, and a luminous body 32. The light emitting section 36 is provided in a position that is apart from the electron emitting element 1 so that the luminous body 32 faces the electron emitting element 1.

Suitable materials of the luminous body 32 are materials that are excited by electrons and that correspond to red light emission, green light emission, and blue light emission, respectively. Examples usable as such materials corresponding to red are $Y_2O_3$:Eu, and (Y, Gd)$BO_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:Eu$^{2+}$. A film of the luminous body 32 is formed on the ITO film 33 which is formed on the glass substrate 34. It is preferable that the luminous body 32 is approximately 1 µm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous body 32, a mixture of epoxy resin serving as a binder and luminous-body particles is prepared, and a film of the mixture may be formed by a known method such as a bar coater method or a dropping method.

In this embodiment, in order to increase a brightness of light emitted from the luminous body 32, it is necessary to accelerate, toward the luminous body, electrons which are emitted from the electron emitting element 1. Accordingly, between the electrode substrate 2 of the electron emitting element 1 and the ITO film 33 of the light-emitting section 36, a power supply 35 should be provided in order to form an electric field for accelerating the electrons. In this case, it is preferable that: (i) a distance between the luminous body 32 and the electron emitting element 1 is 0.3 mm to 1 mm; a voltage applied by the power supply 7 is 18V; and a voltage applied by the power supply 35 is 500 V to 2000 V.

A light emitting device 31' shown in FIG. 7 includes the electron emitting device 10 including an electron emitting element 1 and a power supply 7 for applying a voltage to the electron emitting element 1, and a luminous body 32. In the light emitting device 31', the luminous body 32 is a planar luminous body which is provided on a surface of the electron emitting element 1. In the present embodiment, a layer of the luminous body 32 is formed on a surface of the electron emitting element 1, in such a manner that a mixture of epoxy resin serving as a binder and luminous-body particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

The light emitting device 31" shown in FIG. 8 includes the electron emitting device 10 including an electron emitting element I and a power supply 7 for applying a voltage to the electron emitting element 1. Further, in an electron acceleration layer 4 of the electron emitting element 1, fluorescent fine particles as a luminous body 32' are mixed. In this case, the luminous body 32' may be configured to also serve as the insulating fine particles 5. Generally, however, the luminous-body fine particles have a low electric resistance. As compared to electric resistance of the insulating fine particles 5, the electric resistance of the luminous-body fine particles is clearly lower. Therefore, when the luminous-body fine particles are mixed in replacement of the insulating fine particles 5, an amount of the luminous-body fine particles should be suppressed to a small amount. For example, when spherical silica particles (average particle diameter of 110 nm) is used as the insulating fine particles 5 and ZnS:Mg (average particle diameter of 500 nm) are used as the luminous-body fine particles, an appropriate mixture ratio by weight of the insulating fine particles 5 and the luminous-body fine particles is approximately 3:1.

In the above light emitting devices 31, 31', and 31", electrons emitted from the electron emitting device 10 are caused to collide with the corresponding fluorescent bodies 32 and 32' so that light is emitted.

Note that if the conductive fine particles 6 of the electron emitting element 1 is a conductor that has high resistance to oxidation, the light emitting devices 31, 31', and 31" can work in the atmosphere because the electrons can be emitted into the atmosphere. Moreover, regardless of what kind of conductor the conductive fine particles 6 is, sealed in vacuum, the light emitting devices 31, 31', and 31" can work more efficiently because an electron emission current increases.

Figure 9:
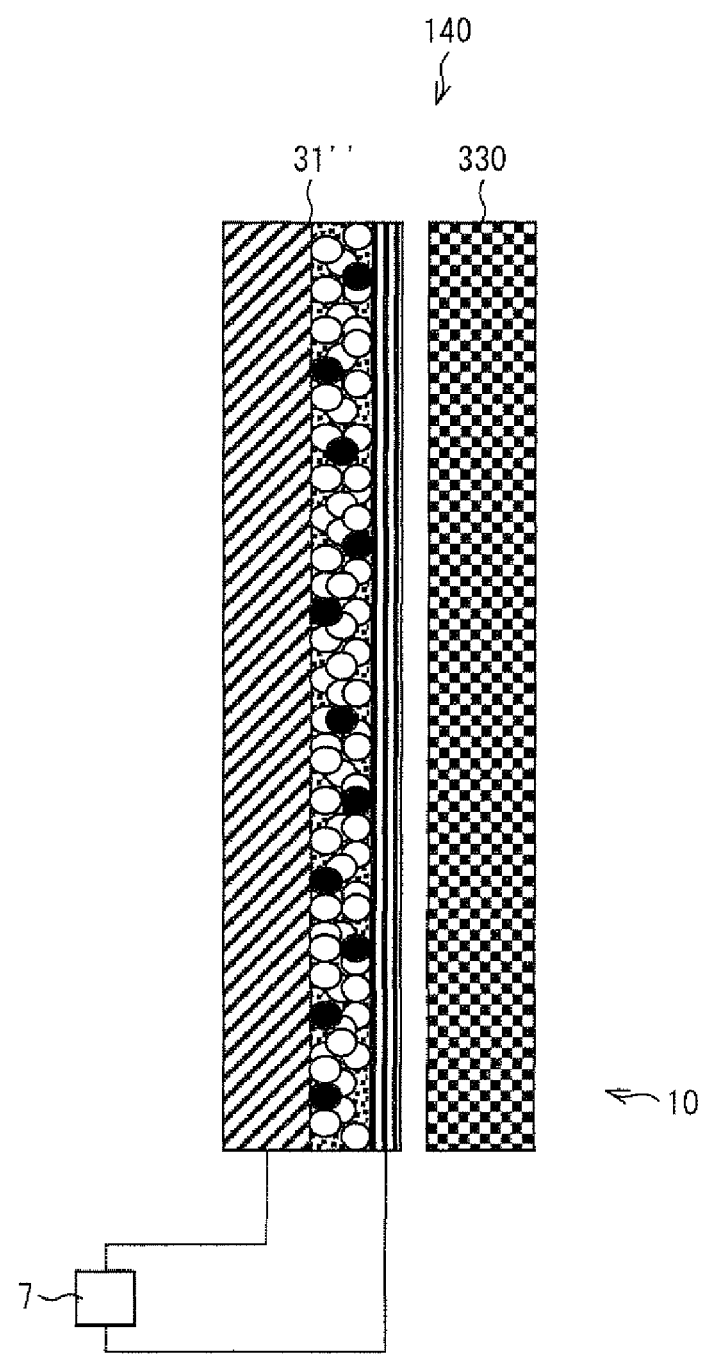
FIG. 9 is a diagram illustrating an example of an image display device which includes a light emitting device including an electron emitting device of the present invention.

FIG. 9 illustrates an example of an image display device of the present invention which includes a light emitting device of the present invention. An image display device 140 illustrated in FIG. 9 includes a light emitting device 31" illustrated in FIG. 8, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be configured to emit, for example, 10 µA/cm² of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 6 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 µA/cm² of electrons per unit of time, at the applied voltage in the range of 20 V to 35 V.

Embodiment 5

Figure 10:
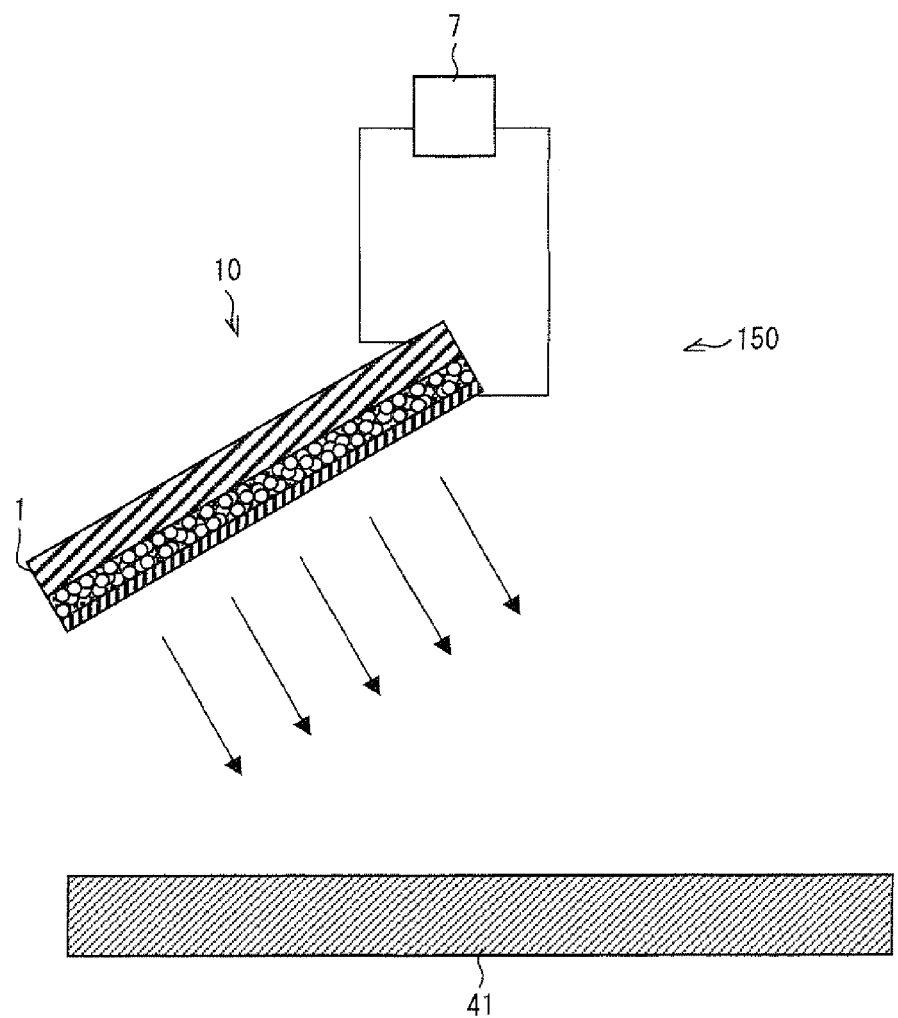
FIG. 10 is a diagram illustrating an example of a cooling device including an electron emitting device of the present invention.
Figure 11:
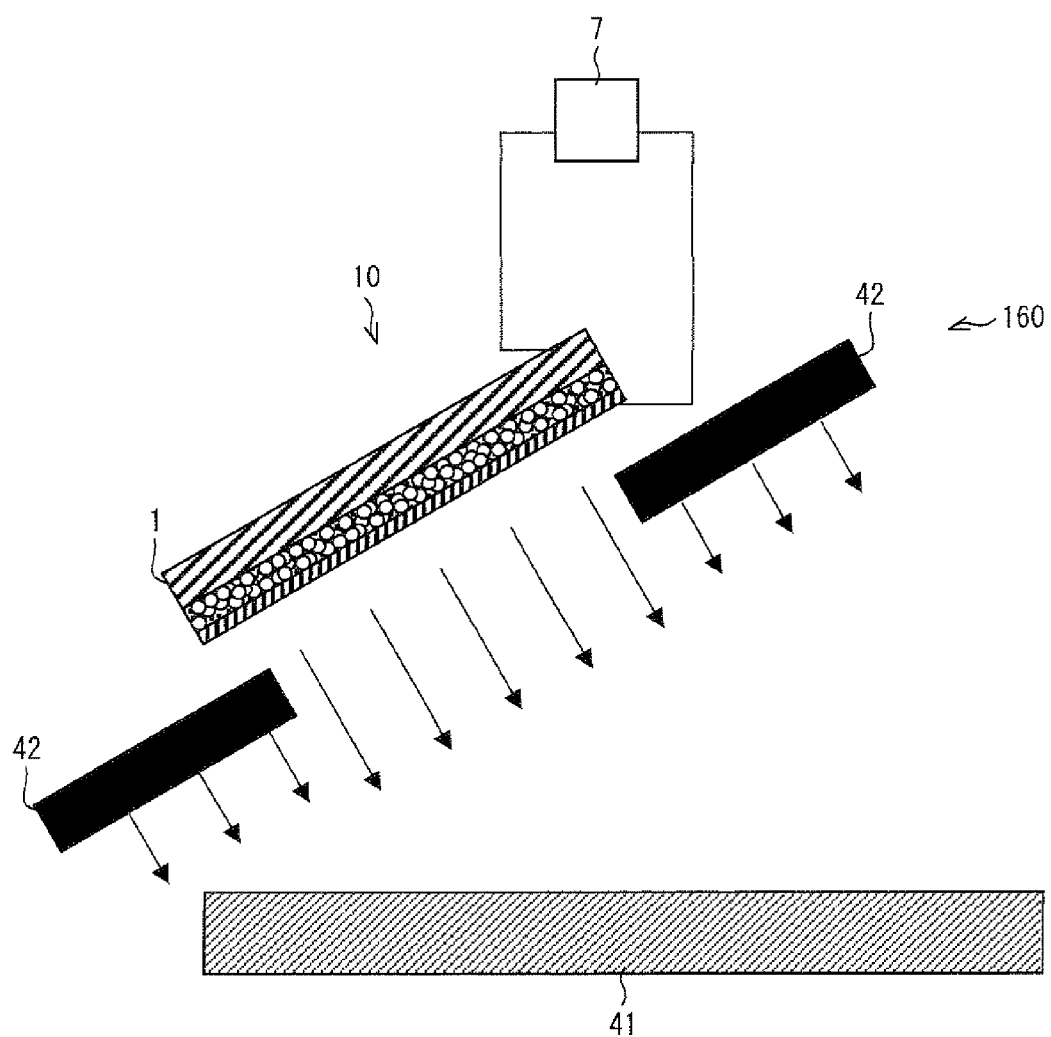
FIG. 11 is a diagram illustrating another example of a cooling device including an electron emitting device of the present invention.

FIG. 10 and FIG. 11 show examples of cooling devices 150 and 160 of the present invention each including an electron emitting device 10 employing an electron emitting element 1 of the present invention described in Embodiment 1. The cooling device may also be used as an air blowing device.

Moreover, each of the cooling devices 150 and 160 of the present invention may employ an electron emitting device 110 of Embodiment 2.

The cooling device 150 illustrated in FIG. 10 includes the electron emitting device 10 including the electron emitting element 1 and a power supply 7 for applying a voltage to the electron emitting element 1. In the cooling device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 µA/cm² of electrons per unit of time in the atmosphere.

In addition to the configuration of the cooling device 150 illustrated in FIG. 10, a cooling device 160 illustrated in FIG. 16 further includes a blowing fan 42. In the cooling device 160 illustrated in FIG. 11, an electron emitting element 1 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent to the object 41, the air sent to the object 41 is attracted to the surface of the object 41 by electric force in the vicinity of the object 41. This makes it possible to replace the air in the vicinity of the surface of the object 41. In the present embodiment, because the cooling devices 150 and 160 of the present invention blow air including electrically charged particles such as electrons or ions, the cooling efficiency is significantly improved.

If the conductive fine particles 6 that are included in the electron emitting element 1 or electron emitting element 101, which elements are used in the cooling devices 150 and 160, are conductors that has high resistance to oxidation, the cooling devices 150 and 160 can work in the atmosphere.

The embodiments and examples as described above serve only as examples, and the electron emitting elements 1 and 101 may also be used in other devices, such as an electron-beam curing device. The electron-beam curing device includes the electron emitting element and a power supply for applying a voltage to the electron emitting element, and an accelerating electrode 21 for accelerating electrons. In this electron-beam curing device, the electron emitting element serving as an electron source emits electrons, and the electrons emitted are accelerated by the accelerating electrode so that the electrons collide with an object to be cured.

Configuration of the Present Invention

As described above, an electron emitting element of the present invention is an electron emitting element including: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including (a) conductive fine particles and (b) insulating fine particles whose average particle diameter is greater than that of the conductive fine particles, and $0.3x+3.9 \leq y \leq 75$, where x (nm) is the average particle diameter of the insulating fine particles, and y (nm) is a thickness of the thin-film electrode.

According to the configuration, a thickness of a thin-film electrode which is an electrode on an electron-emitting side is modified with respect to a size of insulating particles. This ensures electrical conduction of the electron emitting element of the above configuration, and thus a sufficient amount of current flows inside the element. As a result, it is possible to stably emit ballistic electrons from the thin-film electrode.

Moreover, the electron emitting element of the present invention may satisfy the following relational expression: $0.3x+3.9 \leq y \leq 60$.

By providing an upper limit of 60 (nm) to the thickness of the thin-film electrode, it is possible to emit the ballistic electrons from the thin-film electrode in a more stable manner.

In the electron emitting element of the present invention, in addition to the above configuration, the average particle diameter of the insulating fine particles is preferably in a range of 12 nm to 110 nm. In this case, a dispersion state of the particle diameter may be made broader than the average particle diameter. For example, fine particles having an average particle diameter of 50 nm may have its particle diameter distribution in a range of 20 nm to 110 nm.

By having the average particle diameter of the insulating fine particles in a range of 12 nm to 110 nm, it is possible to efficiently dissipate Joule heat that occurs at the time when current flows inside the element. This dissipation of Joule heat is carried out by efficiently conducting heat from the inside of the conductive fine particles to the outside of the conductive fine particles that have an average particle diameter smaller than that of the insulating fine particles. This makes it possible to prevent the electron emitting element from being broken down by heat. Further, this also makes it possible to easily control a resistance value of the electron acceleration layer.

Moreover, as described above, an electron emitting element of the present invention is an electron emitting element including: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including (a) conductive fine particles and (b) insulating fine particles whose primary average particle diameter is greater than that of the conductive fine particles, and if the electron acceleration layer includes aggregates of the conductive fine particles, the aggregates having an average particle diameter of 0.35 μm or less.

According to the configuration, no aggregate that is large to the extent that dielectric breakdown is caused is generated in the electron acceleration layer, and so the conductive fine particles are dispersed evenly in the electron acceleration layer.

Additionally to the above configuration, in the electron emitting element of the present invention, because control of electric conductivity is required, a primary average particle diameter of the conductive fine particles should be smaller than that of the insulating fine particles, and is preferably in a range of 3 nm to 10 nm.

In a case where, in the way as described above, a primary average particle diameter of the conductive fine particles is arranged to be smaller than that of the insulating fine particles and preferably in a range of 3 nm to 10 nm, the following effect is obtained.

That is, a conductive path is not formed in the electron acceleration layer by the conductive fine particles. As a result, dielectric breakdown becomes difficult to occur in the electron acceleration layer. There are a lot of unexplained points in terms of principle. However, the ballistic electrons are efficiently generated by use of the conductive fine particles whose primary particle diameter is within the above range.

Moreover, with the insulating fine particles, a primary particle diameter of the fine particles is preferably in a range of 10 nm to 1000 nm, and more preferably in a range of 12 nm to 110 nm.

In the electron emitting element of the present invention, the insulating fine particles may contain an organic polymer or at least one of $SiO_2$, $Al_2O_3$, and $TiO_2$. By arranging the insulating material or the insulating fine particles to contain an organic polymer or at least one of $SiO_2$, $Al_2O_3$, and $TiO_2$, it becomes possible to adjust a resistance value in any range due to a high insulating property of the above substances. In particular, in a case where oxide (of $SiO_2$, $Al_2O_3$, and $TiO_2$) is used as the insulating material or the insulating fine particles and a conductor having a high resistance to oxidation is used as the conductive fine particles, element degradation due to oxidation caused by oxygen in the atmosphere is made more difficult to occur. Therefore, the effect of steadily operating the electron emitting element under the atmospheric pressure can be obtained more significantly.

In the electron emitting element of the present invention, the thin-film electrode may contain at least one of gold, silver, carbon, tungsten, titanium, aluminum, and palladium. Because the thin-film electrode contains at least one of gold, silver, carbon, tungsten, titanium, aluminum, and palladium, tunneling of electrons generated by the electron acceleration layer becomes more efficient because of a low work function of the above substances. As a result, it becomes possible to emit more electrons having high energy to the outside of the electron emitting element.

In the electron emitting element of the present invention: the conductive fine particles may be made of a conductor having a high resistance to oxidation. To have a high resistance to oxidation here means to have a small oxide formation reaction. In general, according to a thermodynamic calculation, when a value of a change $\Delta G$ [kJ/mol] in free energy of oxide formation is negative and greater, the oxide formation reaction occurs more easily. In the present invention, a metal element whose $\Delta G$ is equal to or greater than $-450$ [kJ/mol] is considered to be the conductive fine particles having a high resistance to oxidation. Further, the conductive fine particles having a high resistance to oxidation also include conductive fine particles whose oxide formation reaction is made difficult to occur by attaching, on the conductive fine particles, an insulating material whose average particle diameter is smaller than that of the conductive fine particles or by coating the conductive fine particles with use of such an insulating material.

According to the configuration, because a conductor having a high resistance to oxidation is used as the conductive fine particles, element degradation due to oxidation caused by oxygen in the atmosphere becomes hard to occur. Therefore, the electron emitting element can be more steadily operated even under the atmospheric pressure. Hence, a life of the electron emitting element can be extended and the electron emitting element can be operated continuously for a long time even in the atmosphere.

In the electron emitting element of the present invention, the conductive fine particles are made of a noble metal. Because the conductive fine particles are made of a noble metal as described above, it becomes possible to prevent element degradation such as oxidation caused by oxygen in the atmosphere. This makes it possible to extend a life of the electron emitting element.

As described above, a method of the present invention for manufacturing the electron emitting element that includes: an electrode substrate; a thin-film electrode; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, is a method including the step of: forming the electron acceleration layer on the electrode substrate with a nano-colloidal solution of the conductive fine particles in a liquid state.

According to the method, the electron acceleration layer is formed with a nano-colloidal solution of the conductive fine particles in a liquid state. If conductive fine particles that are dried are used in the manufacturing step of the element, the fine particles are aggregated, therefore is difficult to redisperse the conductive fine particles in the solvent to a size close to the primary particle diameter. Moreover, even if the conductive fine particles that exist in a solvent in a dispersed state is used, once the solvent is mixed with another solvent, the dispersion stability usually deteriorates and thus the fine particles aggregate. As a result, aggregated conductive fine particles that have a large particle diameter become dispersed in the electron acceleration layer. Thus, dielectric breakdown easily occurs.

However, the method according to the present invention uses the nano-colloidal solution in the liquid state. Hence, it is possible to form an electron acceleration layer that has the conductive fine particles evenly dispersed therein. Hence, the method according to the present invention makes it possible to extend a life of the element, thereby allowing stable emission of electrons for a long term and increasing an amount of electron emission current.

Here, the conductive fine particles have an average particle diameter of preferably 0.35 μm or less in a colloid state. By using the conductive fine particles having an average particle diameter of 0.35 μm or less in the colloid state, it is possible to improve dispersibility of the conductive fine particles in the electron acceleration layer.

The method of the present invention for manufacturing the electron emitting element, in addition to the above method, may include the sub-steps of: mixing the nano-colloidal solution of the conductive fine particles with a solvent in which the insulating fine particles are dispersed; and applying the mixture on the electrode substrate.

According to the method, by mixing the nano-colloidal solution of the conductive fine particles with a solvent in which the insulating fine particles are dispersed, it is possible to easily form an electron acceleration layer in which the conductive fine particles are evenly dispersed.

An electron emitting device of the present invention includes: any one of the electron emitting elements described above; and a power supply section for applying a voltage between the electrode substrate and the thin-film electrode.

With the configuration, an electrical conduction is ensured and a sufficient amount of current flows inside an element. Thus, it is possible to provide an electron emitting device which can stably emit ballistic electrons from the thin-film electrode.

Moreover, according to the configuration, it is possible to provide an electron emitting device in which an electron acceleration layer has conductive fine particles dispersed evenly therein, thereby making it possible to emit electrons for a long term.

By using the electron emitting device of the present invention in a light emitting device and an image display device including the light emitting device, it becomes possible to provide a light emitting device that is suppressed in generation of brightness unevenness, that can stably emit electrons, and that can perform long life planar light emission.

Moreover, by using an electron emitting device including an electron emitting element of the present invention in the cooling device, which electron emitting element uses a metal having high resistance to oxidation as the conductive fine particles, it is possible to stably emit electrons to carry out cooling in high efficiency, even in the atmosphere.

Moreover, by using the electron emitting device including the electron emitting element of the present invention in the charging device, which electron emitting element uses a metal having high resistance to oxidation as the conductive fine particles, it is possible to stably emit electrons to charge the object to be charged, even in the atmosphere.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An electron emitting element according to the present invention ensures electrical conduction, by which a sufficient amount of current flows inside an element. This allows emission of ballistic electrons from a thin-film electrode.

Therefore, the present invention can be suitably applied, for example, (i) to a charging device of image forming apparatuses such as an electrophotographic copying machine, a printer, and a facsimile; (ii) an electron-beam curing device; (iii) in combination with a luminous body, to an image display device; or (iv) by utilizing ion wind generated by electrons emitted from the electron emitting element, to a cooling device.

| Reference Signs List | |
|---|---|
| 1, 101 | Electron emitting element |
| 2 | Electrode substrate |
| 3 | Thin-Film Electrode |
| 4, 104 | Electron acceleration layer |
| 5 | Insulating fine particles (Insulating material) |
| 6 | Conductive fine particles |
| 7 | Power supply (Power supply section) |
| 8 | Counter Electrode |
| 9 | Insulating spacer |
| 10, 110 | Electron emitting device |
| 11 | Photoreceptor |
| 31, 31', 31" | Light emitting device |
| 32, 32' | Luminous body (Light emitting body) |
| 33 | ITO film |
| 34 | Glass substrate |
| 35 | Power Supply |
| 36 | Light emitting section |
| 41 | Object to be cooled |
| 42 | Air blowing fan |
| 51 | Opening |
| 90 | Charging device |
| 140 | Image display device |
| 150 | Cooling device |
| 160 | Cooling device |
| 330 | Liquid crystal panel |

What is claimed is:

1. An electron emitting element comprising:
an electrode substrate;
a thin-film electrode; and
an electron acceleration layer sandwiched between the electrode substrate and the thin-film electrode,
the electron emitting element (i) accelerating electrons between the electrode substrate and the thin-film electrode at a time when a voltage is applied between the electrode substrate and the thin-film electrode and (ii) emitting the electrons from the thin-film electrode,
the electron acceleration layer including (a) conductive fine particles and (b) insulating fine particles whose average particle diameter is greater than that of the conductive fine particles, and $$0.3x+3.9 \leq y \leq 75,$$

where x (nm) is the average particle diameter of the insulating fine particles, and y (nm) is a thickness of the thin-film electrode.

2. The electron emitting element as set forth in claim 1, wherein the following relational expression is satisfied:

$$0.3x+3.9 \leq y \leq 60.$$

3. The electron emitting element as set forth in claim 1, wherein:
the average particle diameter of the insulating fine particles is in a range of 12 nm to 110 nm.

4. The electron emitting element as set forth in claim 1, wherein:
the insulating fine particles contain an organic polymer or at least one of $SiO_2$, $Al_2O_3$, and $TiO_2$.

5. The electron emitting element as set forth in claim 1, wherein:
the thin-film electrode contains at least one of gold, silver, carbon, tungsten, titanium, aluminum, and palladium.

6. The electron emitting element as set forth in claim 1, wherein:
the conductive fine particles are made of a conductor having a high resistance to oxidation.

7. The electron emitting element as set forth in claim 6, wherein:
the conductive fine particles are made of a noble metal.

8. An electron emitting device comprising:
an electron emitting element as set forth in claim 1; and
a power supply section for applying a voltage between the electrode substrate and the thin-film electrode.

9. A light emitting device comprising:
an electron emitting device as set forth in claim 8; and
a luminous body,
the light emitting device causing the luminous body to emit light by causing the electron emitting device to emit electrons.

10. An image display device comprising:
a light emitting device as set forth in claim 9.

11. A cooling device comprising:
an electron emitting device,
said electron emitting device comprising:
an electron emitting element as set forth in claim 6; and
a power supply section for applying a voltage between the electrode substrate and the thin-film electrode,
the cooling device cooling an object to be cooled by causing the electron emitting device to emit electrons.

12. A charging device comprising:
an electron emitting device,
said electron emitting device comprising:
an electron emitting element as set forth in claim 6; and
a power supply section for applying a voltage between the electrode substrate and the thin-film electrode,
the charging device charging a photoreceptor by causing the electron emitting device to emit electrons.

13. An electron emitting element comprising:
an electrode substrate;
a thin-film electrode; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the electron acceleration layer including (a) conductive fine particles and (b) insulating fine particles whose primary average particle diameter is greater than that of the conductive fine particles, and
the electron acceleration layer includes aggregates of the conductive fine particles, the aggregates having an average particle diameter of 0.35 µm or less.

14. The electron emitting element as set forth in claim 13, wherein the conductive fine particles are made of a conductor having a high resistance to oxidation.

15. The electron emitting element as set forth in claim 14, wherein the conductive fine particles are made of a noble metal.

16. The electron emitting element as set forth in claim 13, wherein the primary average particle diameter of the conductive fine particles is in a range of 3 nm to 10 nm.

17. A method for manufacturing an electron emitting element that includes:
an electrode substrate;
a thin-film electrode; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the method comprising the step of:
forming the electron acceleration layer on the electrode substrate with a nano-colloidal solution of the conductive fine particles in a liquid state wherein the conductive fine particles have an average particle diameter of 0.35 µm or less in a colloid state.

18. The method as set forth in claim 17 for manufacturing an electron emitting element, wherein:
the step of forming the electron acceleration layer includes the sub-steps of:
mixing the nano-colloidal solution of the conductive fine particles with a solvent in which the insulating fine particles are dispersed; and
applying the mixture on the electrode substrate.

19. An electron emitting device comprising:
an electron emitting element as set forth in claim 13; and
a power supply section for applying a voltage between the electrode substrate and the thin-film electrode.

20. A light emitting device comprising:
an electron emitting device as set forth in claim 19; and
a luminous body,
the light emitting device causing the luminous body to emit light by causing the electron emitting device to emit electrons.

21. An image display device comprising:
a light emitting device as set forth in claim 20.

22. A cooling device comprising:
an electron emitting device,
said electron emitting device comprising:
- an electron emitting element as set forth in claim 14; and
- a power supply section for applying a voltage between the electrode substrate and the thin-film electrode, the cooling device cooling an object to be cooled by causing the electron emitting device to emit electrons.

23. A charging device comprising:
an electron emitting device,
said electron emitting device comprising:
- an electron emitting element as set forth in claim 14; and
- a power supply section for applying a voltage between the electrode substrate and the thin-film electrode, the charging device charging a photoreceptor by causing the electron emitting device to emit electrons.

* * * * *